United States Patent
Wills, Jr. et al.

(10) Patent No.: US 12,485,199 B2
(45) Date of Patent: Dec. 2, 2025

(54) FLUID PURIFICATION SYSTEMS AND METHODS

(71) Applicants: Richard Nelson Wills, Jr., Cramerton, NC (US); Sahaj R. Patel, Charlotte, NC (US); Christopher M. Tress, Louisville, KY (US); Jerry Loraine Dellinger, Cramerton, NC (US)

(72) Inventors: Richard Nelson Wills, Jr., Cramerton, NC (US); Sahaj R. Patel, Charlotte, NC (US); Christopher M. Tress, Louisville, KY (US); Jerry Loraine Dellinger, Cramerton, NC (US)

(*) Notice: Subject to any disclaimer, the term of this patent is extended or adjusted under 35 U.S.C. 154(b) by 976 days.

(21) Appl. No.: 17/567,756

(22) Filed: Jan. 3, 2022

(65) Prior Publication Data

US 2022/0211897 A1    Jul. 7, 2022

Related U.S. Application Data

(60) Provisional application No. 63/133,410, filed on Jan. 3, 2021.

(51) Int. Cl.
| | |
|---|---|
| A61L 2/00 | (2006.01) |
| A61L 9/20 | (2006.01) |
| A61N 5/00 | (2006.01) |
| B01D 46/00 | (2022.01) |
| B01D 53/00 | (2006.01) |
| B01D 53/86 | (2006.01) |
| G01N 23/00 | (2006.01) |

(52) U.S. Cl.
CPC .......... *A61L 9/205* (2013.01); *B01D 46/0028* (2013.01); *B01D 53/007* (2013.01); *B01D 53/86* (2013.01); *A61L 2209/12* (2013.01); *A61L 2209/14* (2013.01); *A61L 2209/16* (2013.01); *B01D 2255/20707* (2013.01); *B01D 2255/802* (2013.01); *B01D 2259/804* (2013.01); *B01D 2279/65* (2013.01)

(58) Field of Classification Search
CPC .... A61L 9/20; A61L 2/10; A61L 9/205; F24F 3/166
USPC ....... 422/24, 120; 250/455.11, 454.11, 492.1
See application file for complete search history.

(56) References Cited

U.S. PATENT DOCUMENTS 6,409,928 B1 * 6/2002 Gonzalez ............... B01J 19/123
                                                          210/759
6,569,319 B2   5/2003 Kuennen et al.
(Continued)

*Primary Examiner* — Monzer R Chorbaji
(74) *Attorney, Agent, or Firm* — Nelson Mullins Riley & Scarborough LLP

(57) ABSTRACT

Purification assemblies and methods of use. A method of using a purification assembly, the purification assembly having a housing having a first open end and an opposite second open end, the housing defining an interior volume, and a longitudinal axis extending between the first open end and the second open end. The method includes forming a ring of UV radiation sources on an interior surface of the housing, wherein the longitudinal axis extends through the ring, and wherein at least a first set of the UV radiation sources lie on a plane. The method also includes causing the first set of UV radiation sources to emit UV radiation along the plane and flowing a stream of air through the housing toward the ring of UV radiation sources, wherein the intensity of the UV radiation exceeds a threshold along the entirety of the plane within the housing.

20 Claims, 25 Drawing Sheets

(56) References Cited

U.S. PATENT DOCUMENTS

| | | | |
|---|---|---|---|
| 7,497,719 B2 | 3/2009 | Ciancanelli et al. | |
| 7,604,505 B2 | 10/2009 | Zayas | |
| 8,308,497 B2 | 11/2012 | Zayas et al. | |
| 8,350,228 B2 | 1/2013 | Welker | |
| 8,581,522 B2 | 11/2013 | Inskeep | |
| 9,517,280 B2 | 12/2016 | Ynn et al. | |
| 10,451,298 B2 * | 10/2019 | Matschke | A61L 2/10 |
| 2004/0074392 A1 | 4/2004 | Choi | |
| 2005/0242013 A1 * | 11/2005 | Hunter | A61L 2/10 |
| | | | 95/267 |
| 2006/0120929 A1 | 6/2006 | Ward et al. | |
| 2008/0008620 A1 | 1/2008 | Alexiadis | |
| 2009/0004046 A1 | 1/2009 | McEllen | |
| 2010/0301768 A1 | 12/2010 | Chemel et al. | |

* cited by examiner

FLUID PURIFICATION SYSTEMS AND METHODS

PRIORITY CLAIM

This application claims the benefit under 35 U.S.C. § 119(e) of U.S. Provisional Application Ser. No. 63/133,410, filed Jan. 3, 2021, entitled "Improved Fluid Purification Systems and Methods," the entire disclosure of which is relied upon and incorporated by reference herein for all purposes.

TECHNICAL FIELD

Embodiments of the present invention generally relate to the field of heating, ventilation, and air conditioning (HVAC). More particularly, various embodiments relate to improved devices and methods for cleaning and/or purifying air flowing through a duct to neutralize or remove dust, viruses, bacteria, mold, and/or other microorganisms.

BACKGROUND

Various air filtration and air purification systems that are installed inline with HVAC ductwork are known. In addition to removable particulate air filters, other known air purification and/or filtration systems include ultraviolet (UV) lights, electrostatic filters, and electrostatic precipitators. With regard to UV lights, it is known to dispose the UV light within a portion of ductwork or within an HVAC unit, such as at the top of a furnace proximate the evaporator coil.

The foregoing discussion is intended only to illustrate various aspects of the related art in the field of the invention at the time, and should not be taken as a disavowal of claim scope.

SUMMARY

In accordance with one embodiment, the present invention provides a purification assembly for use in a duct. The purification assembly comprises a housing, the housing having an upstream end connectable with a first portion of the duct and a downstream end connectable with a second portion of the duct such that the first portion of the duct is in fluid communication with the second portion of the duct via the housing when the housing is connected with the duct. The housing further defines a longitudinal axis extending between the upstream and downstream ends of the housing. A ring of ultraviolet (UV) radiation sources is coupled with an interior surface of the housing, and the UV radiation sources are each configured to emit UV radiation toward the longitudinal axis.

In accordance with another embodiment, the present invention provides a purification assembly for use in a duct. The purification assembly comprises a housing, the housing having a first open end and an opposite second open end. The housing defines an interior volume extending between the first and second open ends. A longitudinal axis extends between the first open end and the second open end. An annular projection is coupled with an interior surface of the housing, and the annular projection extends radially inward toward the longitudinal axis. A plurality of UV radiation sources are coupled with the annular projection. The plurality of UV radiation sources comprise a first set of UV radiation sources facing the first open end, a second set of UV radiation sources facing the second open end, and a third set of UV radiation sources facing the longitudinal axis.

According to yet another embodiment, the present invention provides a method of using a purification assembly. The purification assembly has a housing having a first open end and an opposite second open end. The housing defines an interior volume extending between the first and second open ends, and a longitudinal axis extends between the first open end and the second open end. The method includes forming a ring of UV radiation sources on an interior surface of the housing, wherein the longitudinal axis extends through the ring, and wherein at least a first set of the UV radiation sources lie on a plane. The method also includes causing the first set of UV radiation sources to emit UV radiation along the plane and flowing a stream of air through the housing toward the ring of UV radiation sources, wherein UV radiation has an intensity that exceeds a threshold intensity along the entirety of the plane within the housing.

BRIEF DESCRIPTION OF THE DRAWINGS

Figure 1:
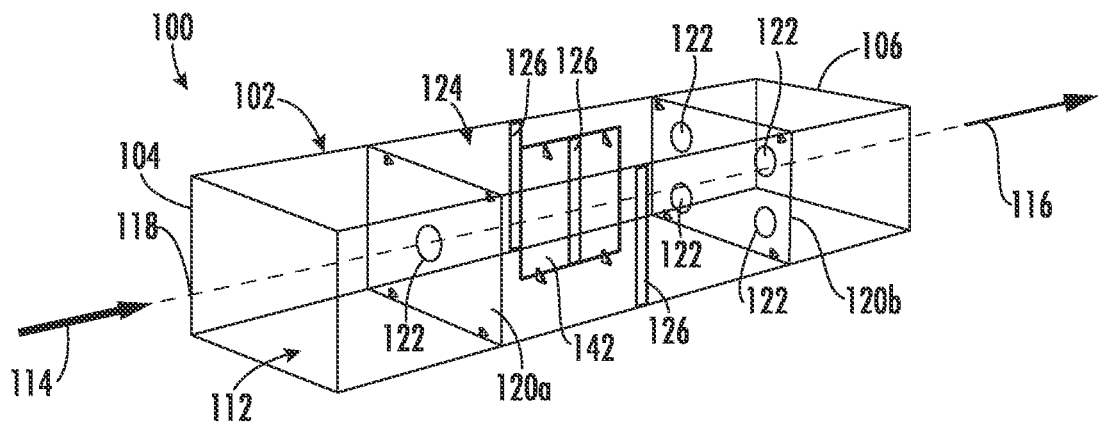
Figure 2:
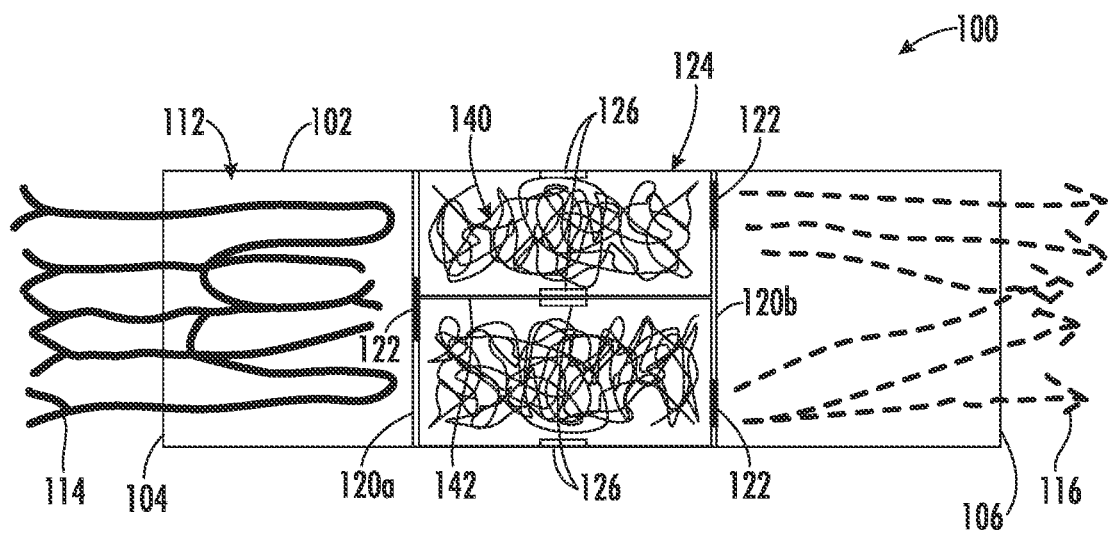
Figure 3:
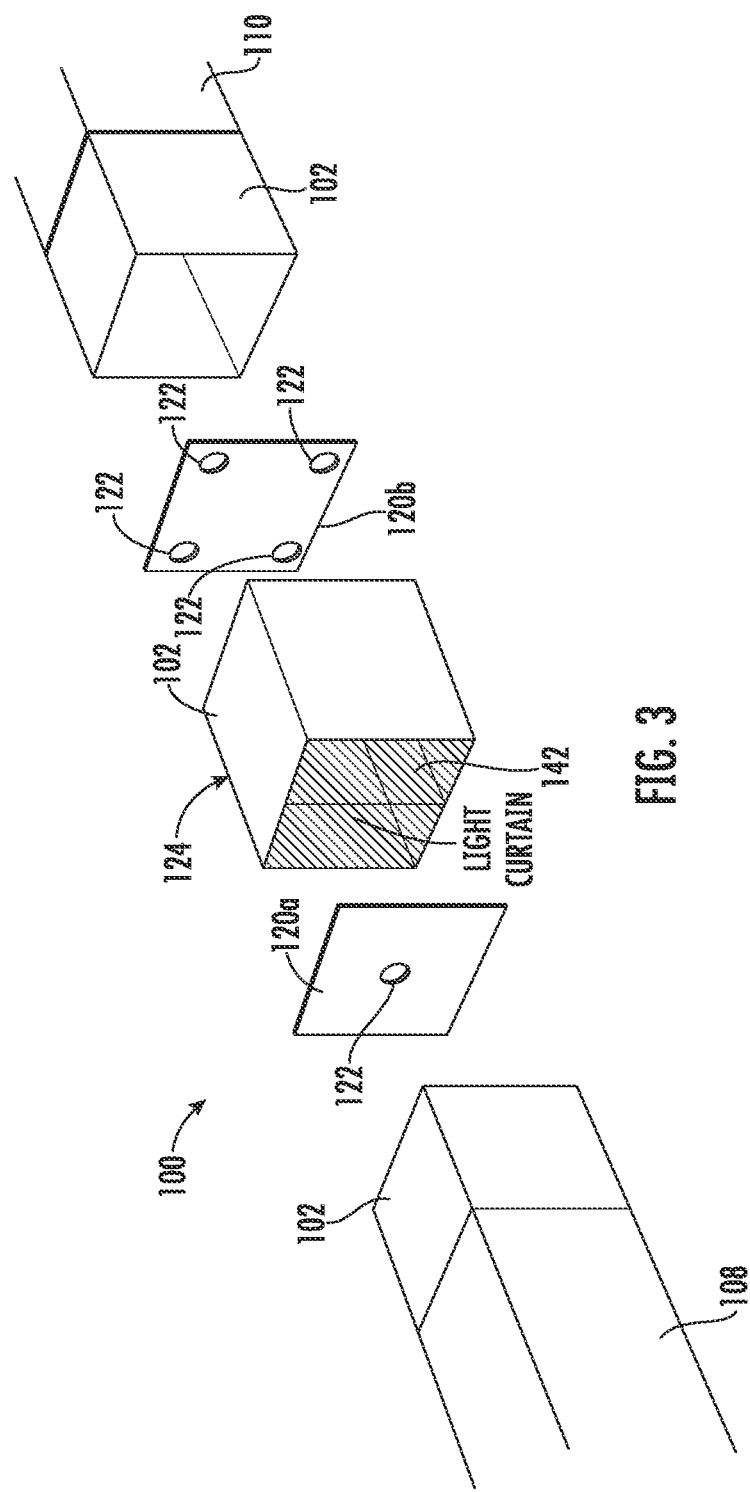
Figure 4:
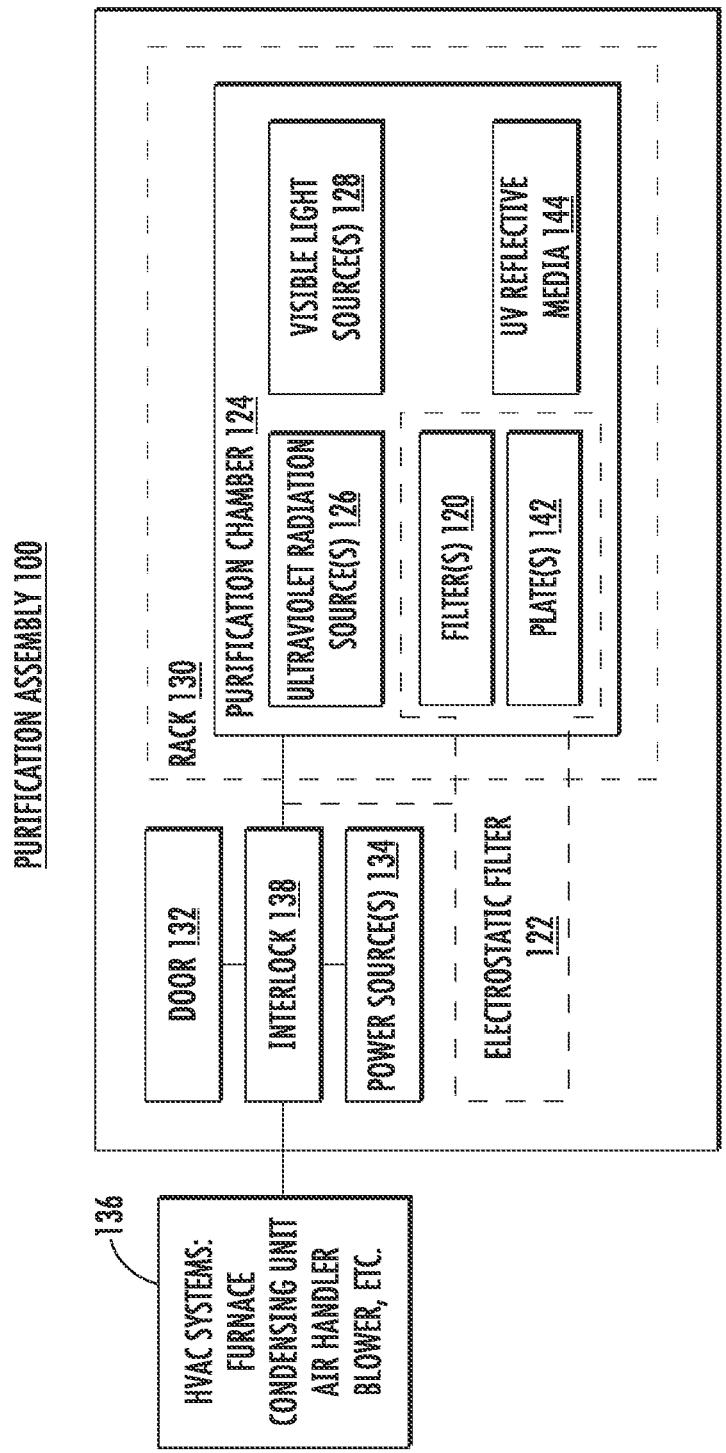
Figure 5:
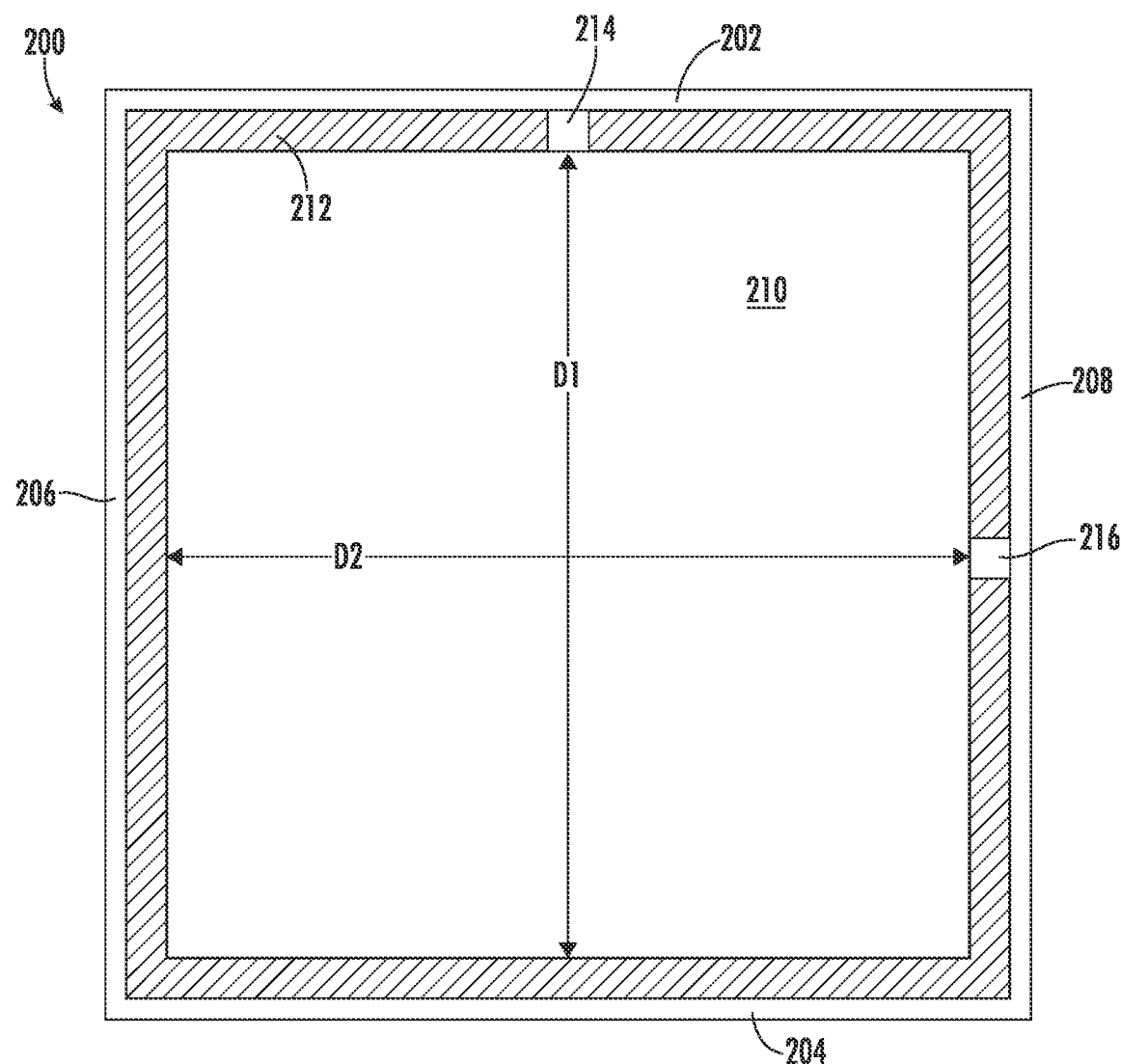
Figure 6:
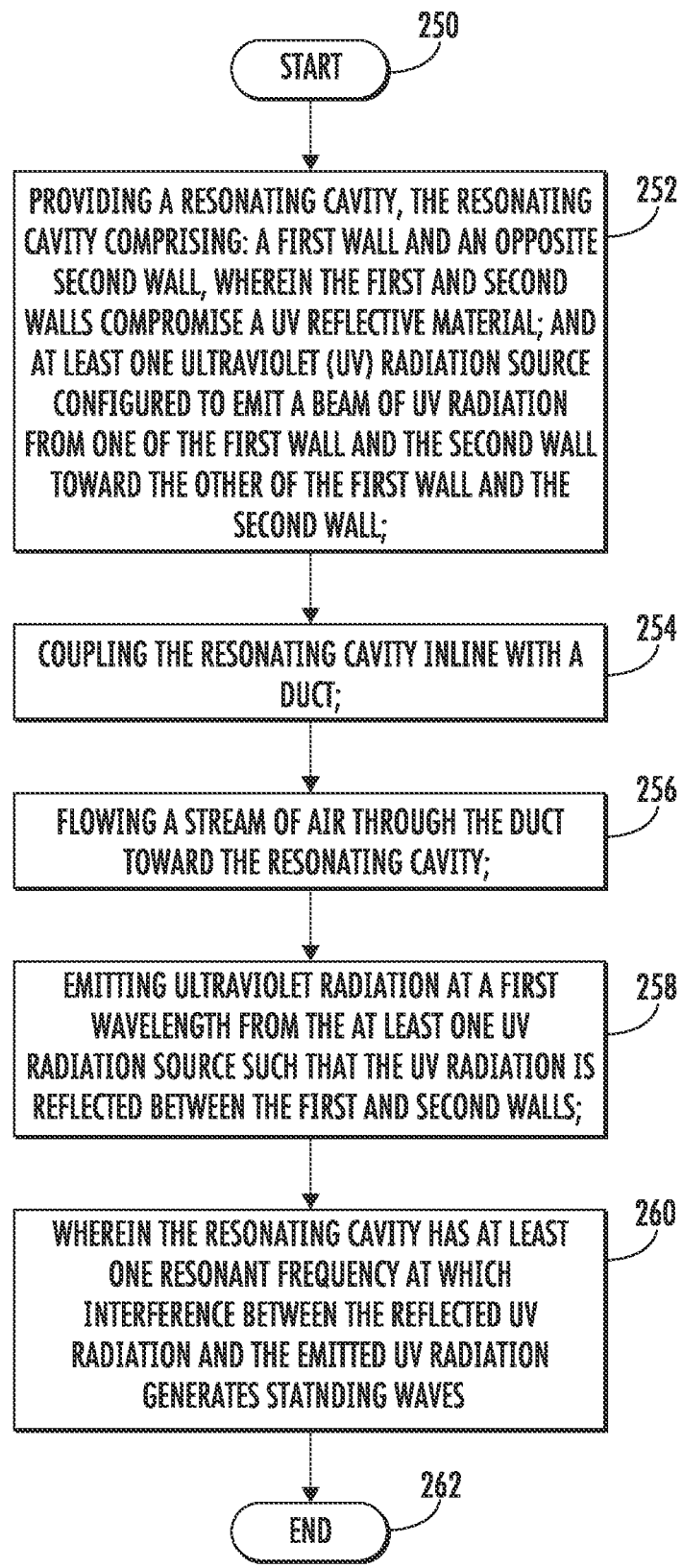
Figure 7:
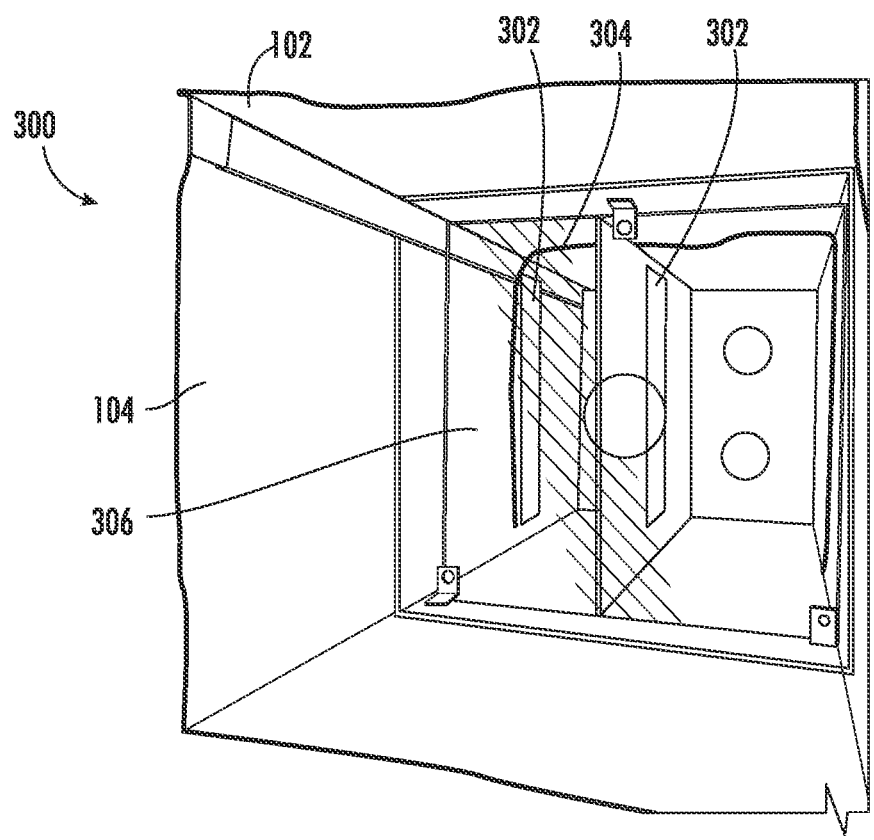
Figure 8:
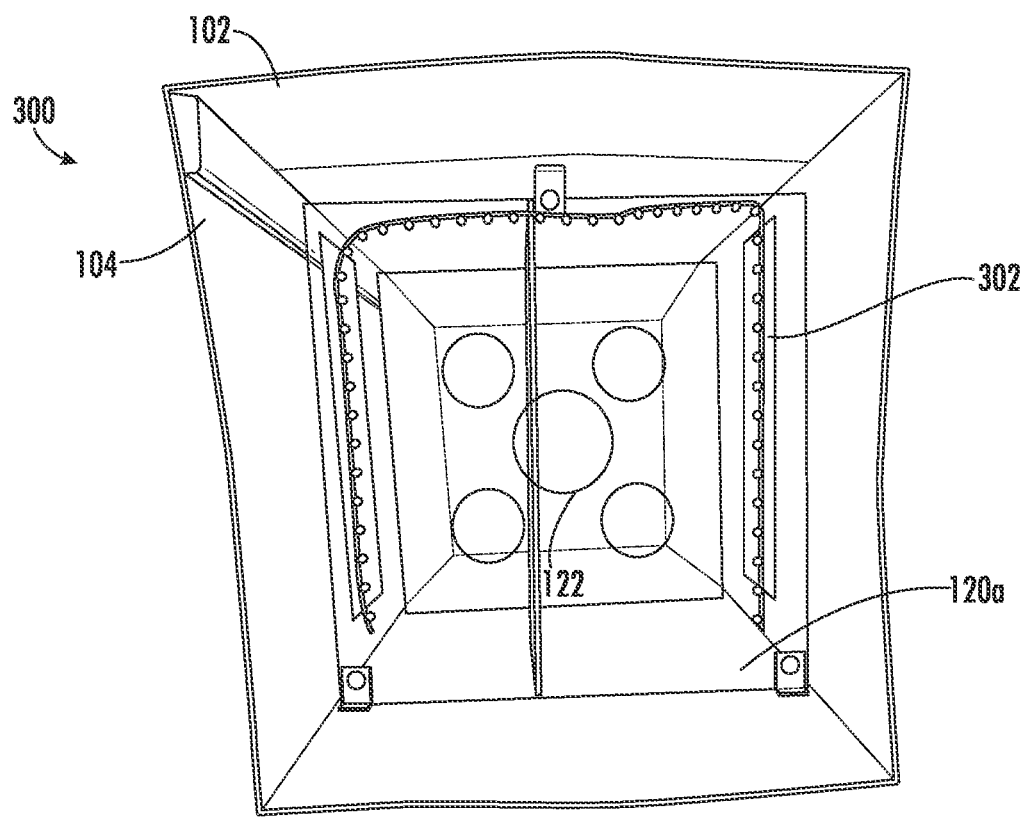
Figure 9:
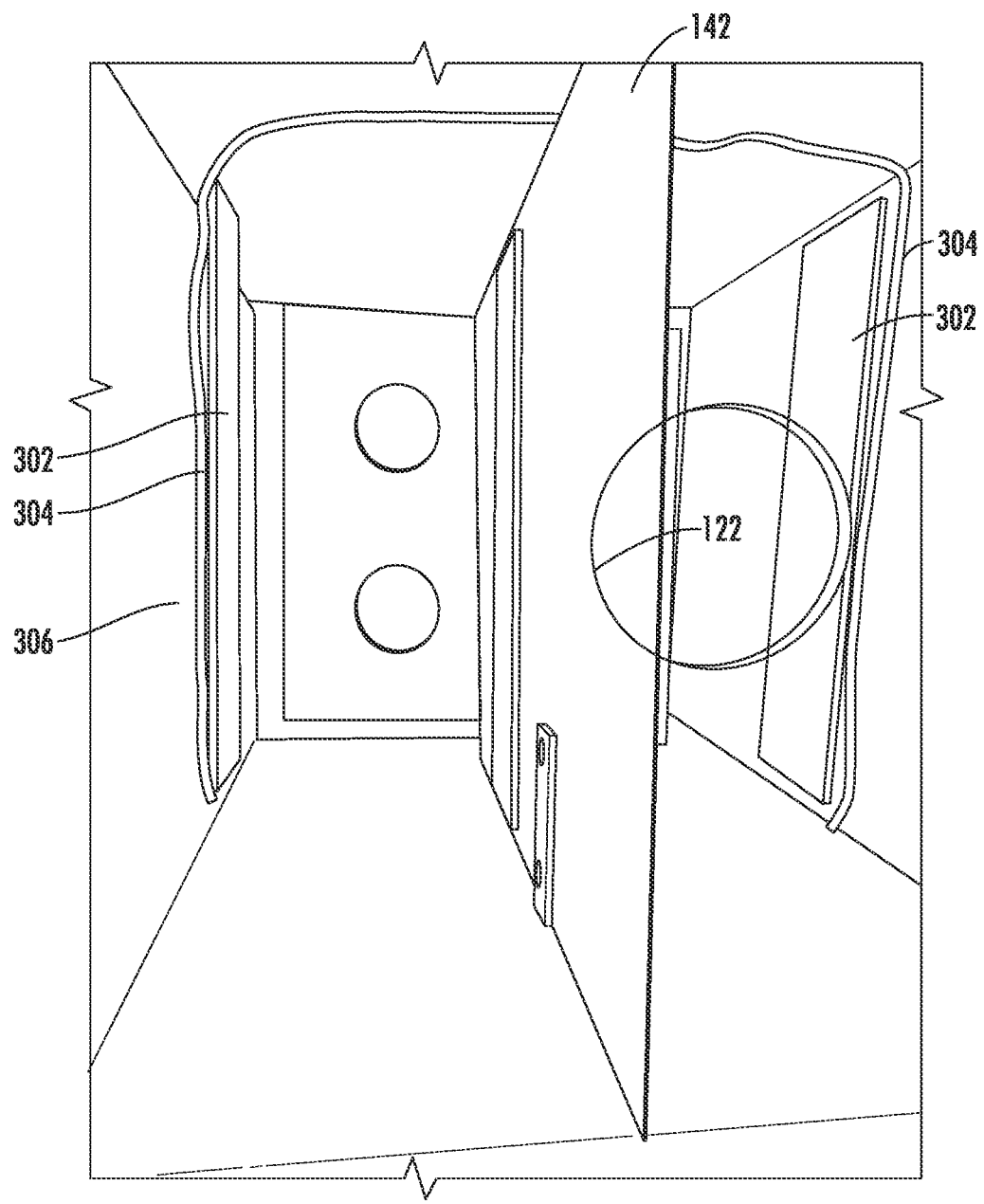
Figure 10:
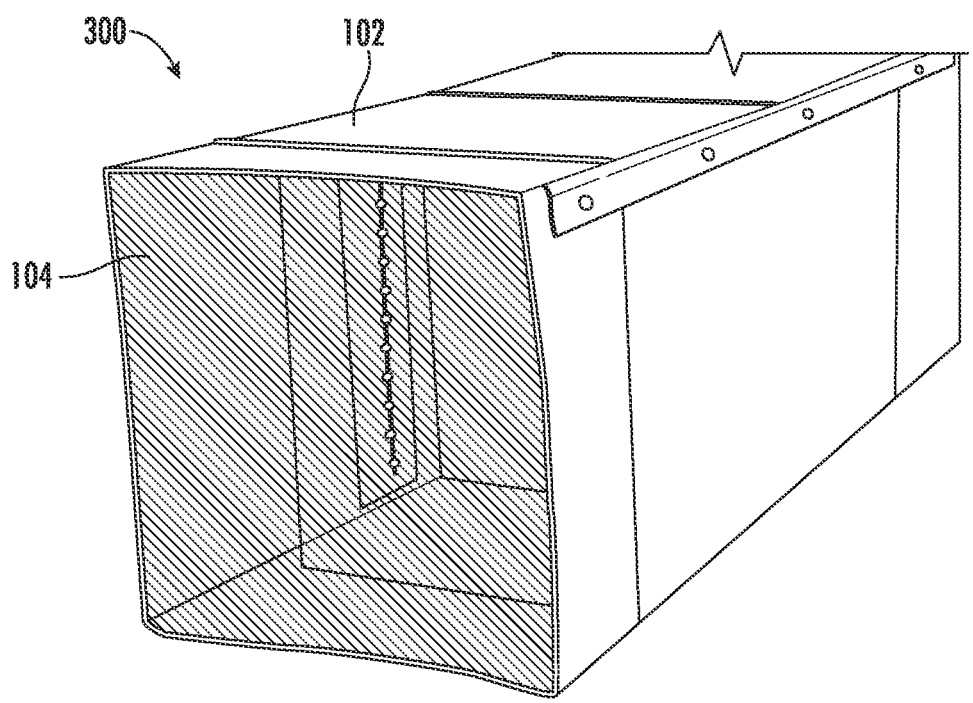
Figure 11:
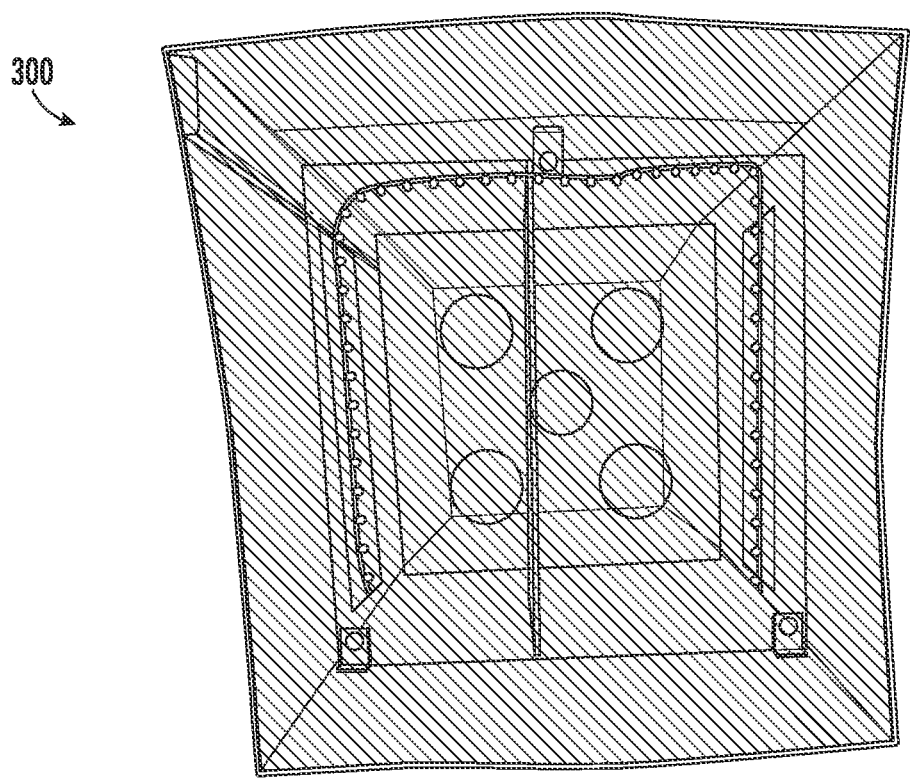
Figure 12:
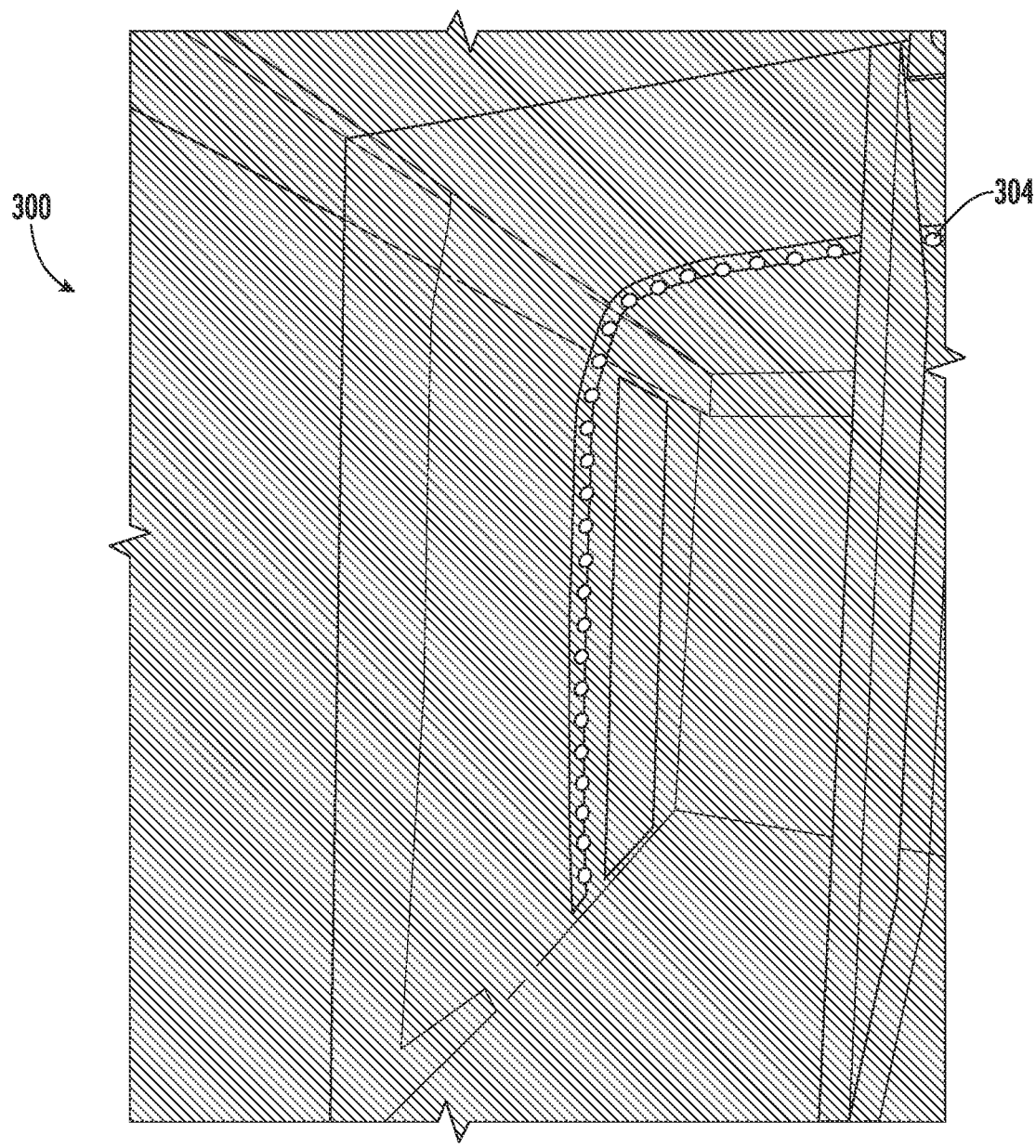
Figure 13A:
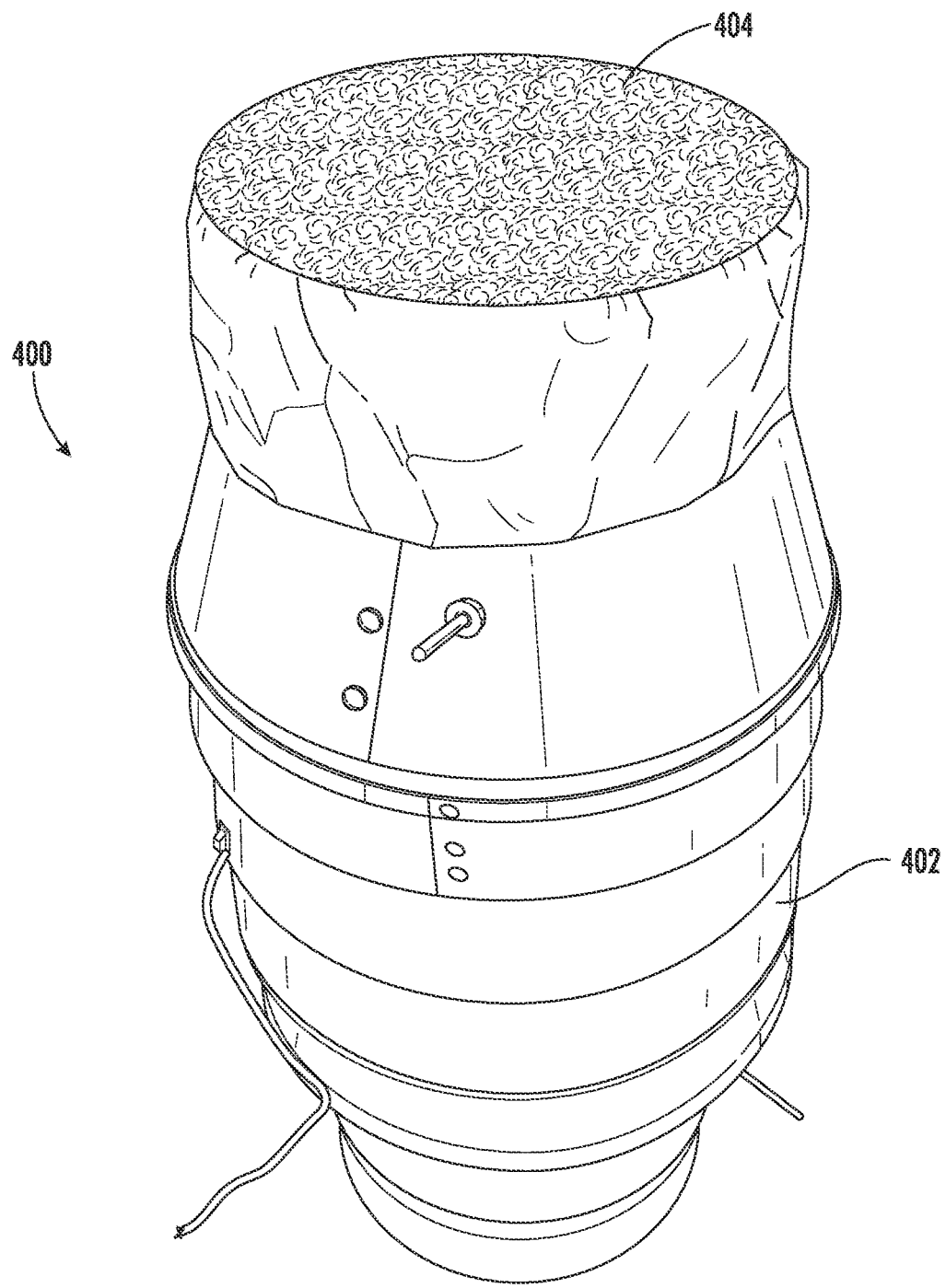
Figure 13B:
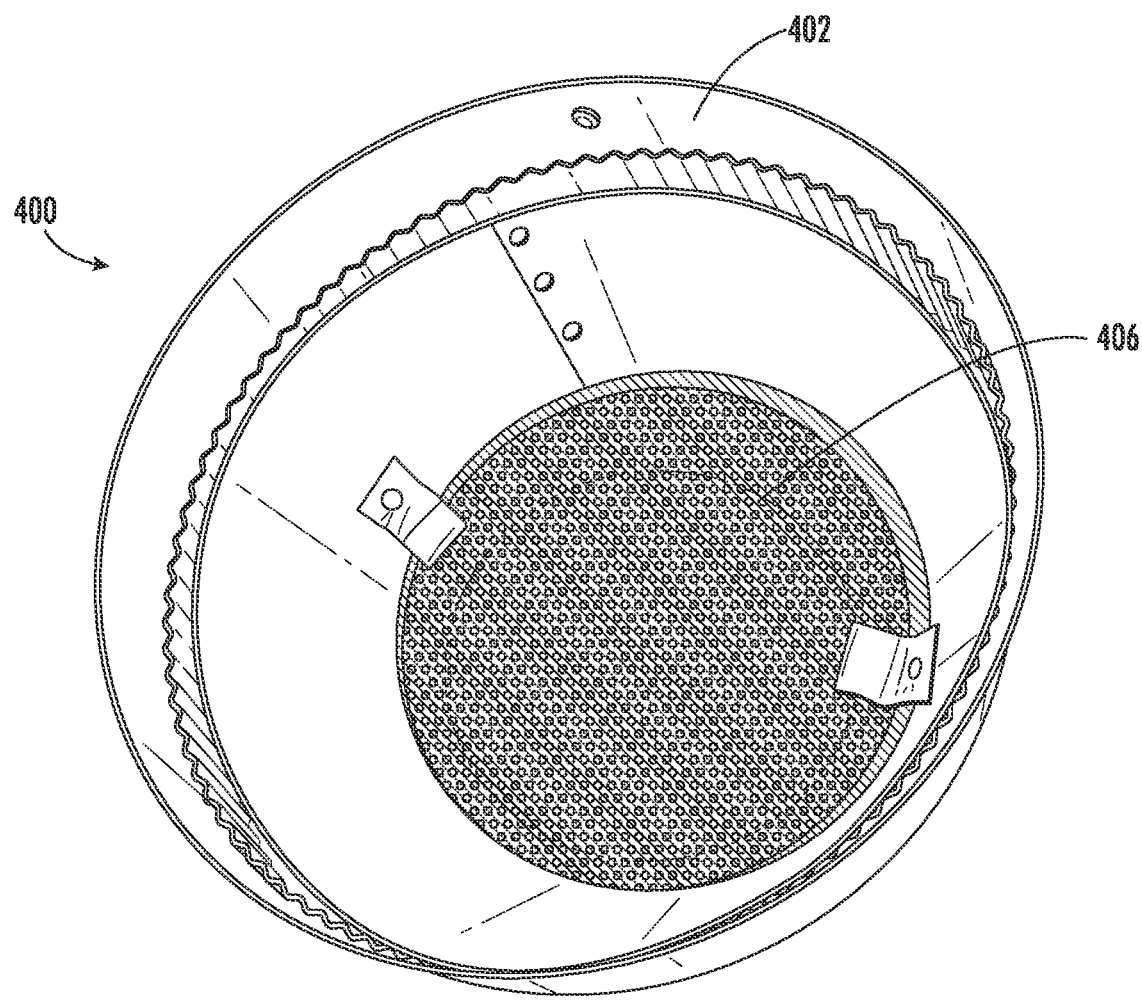
Figure 13C:
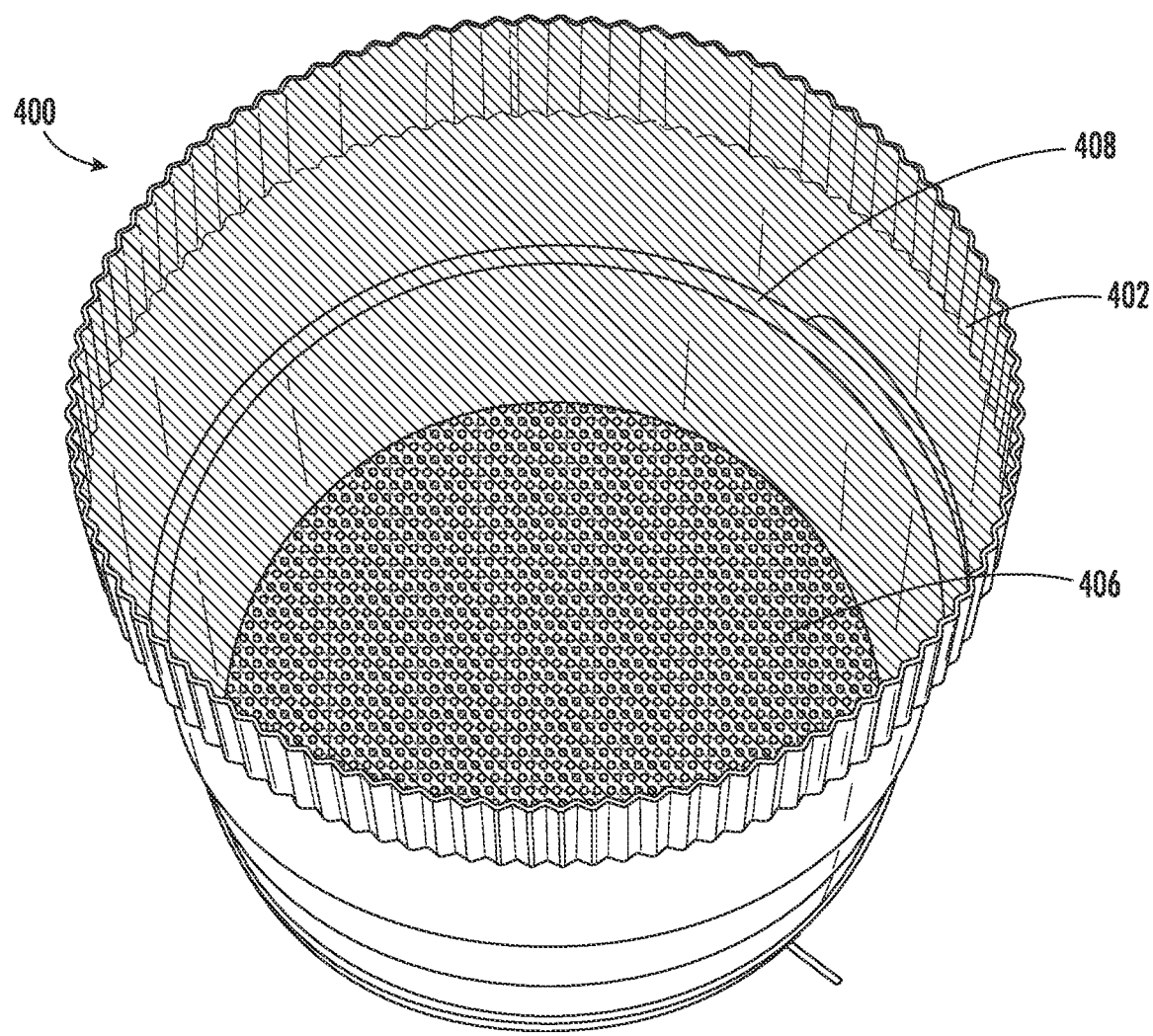
Figure 13D:
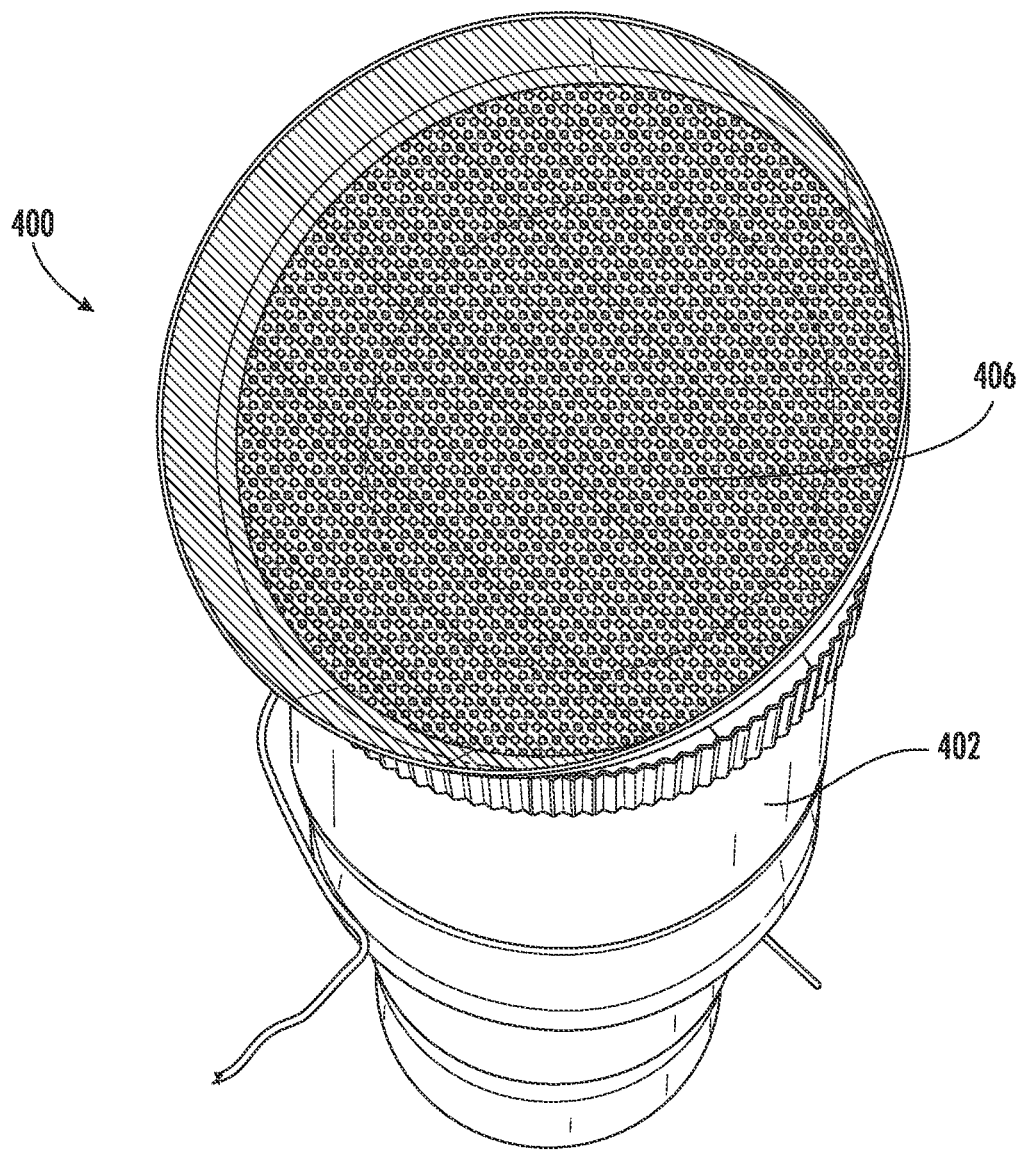
Figure 14A:
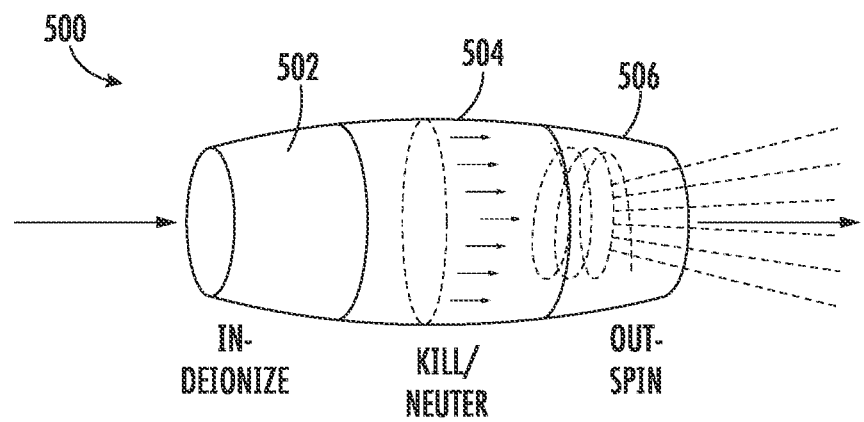
Figure 14B:
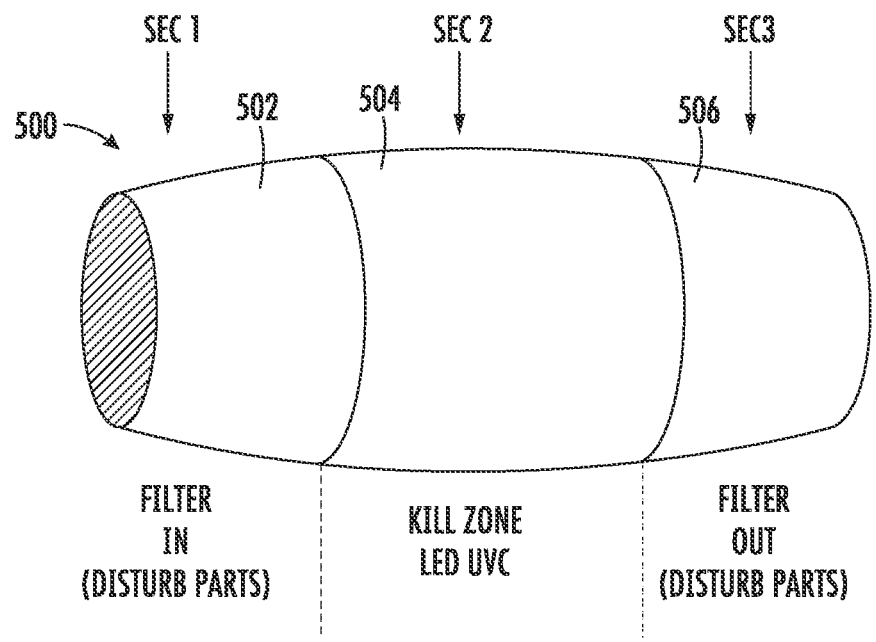
Figure 14C:
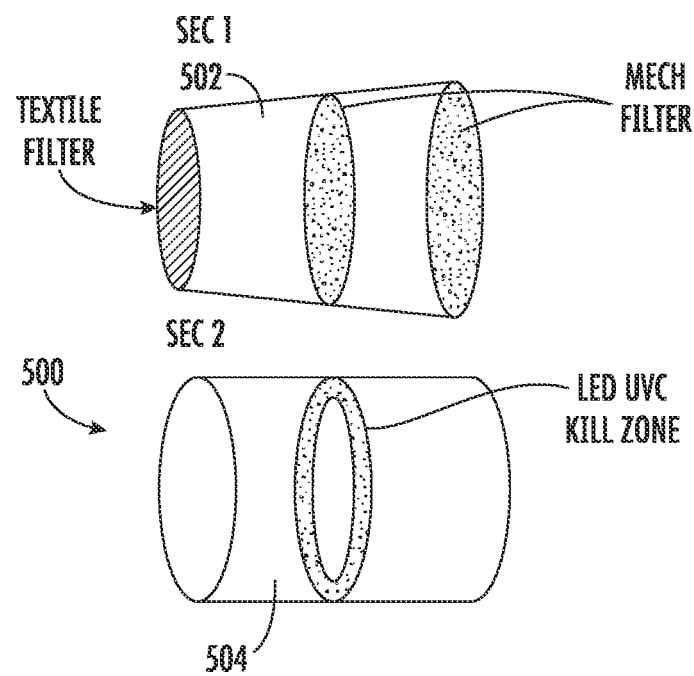
Figure 15A:
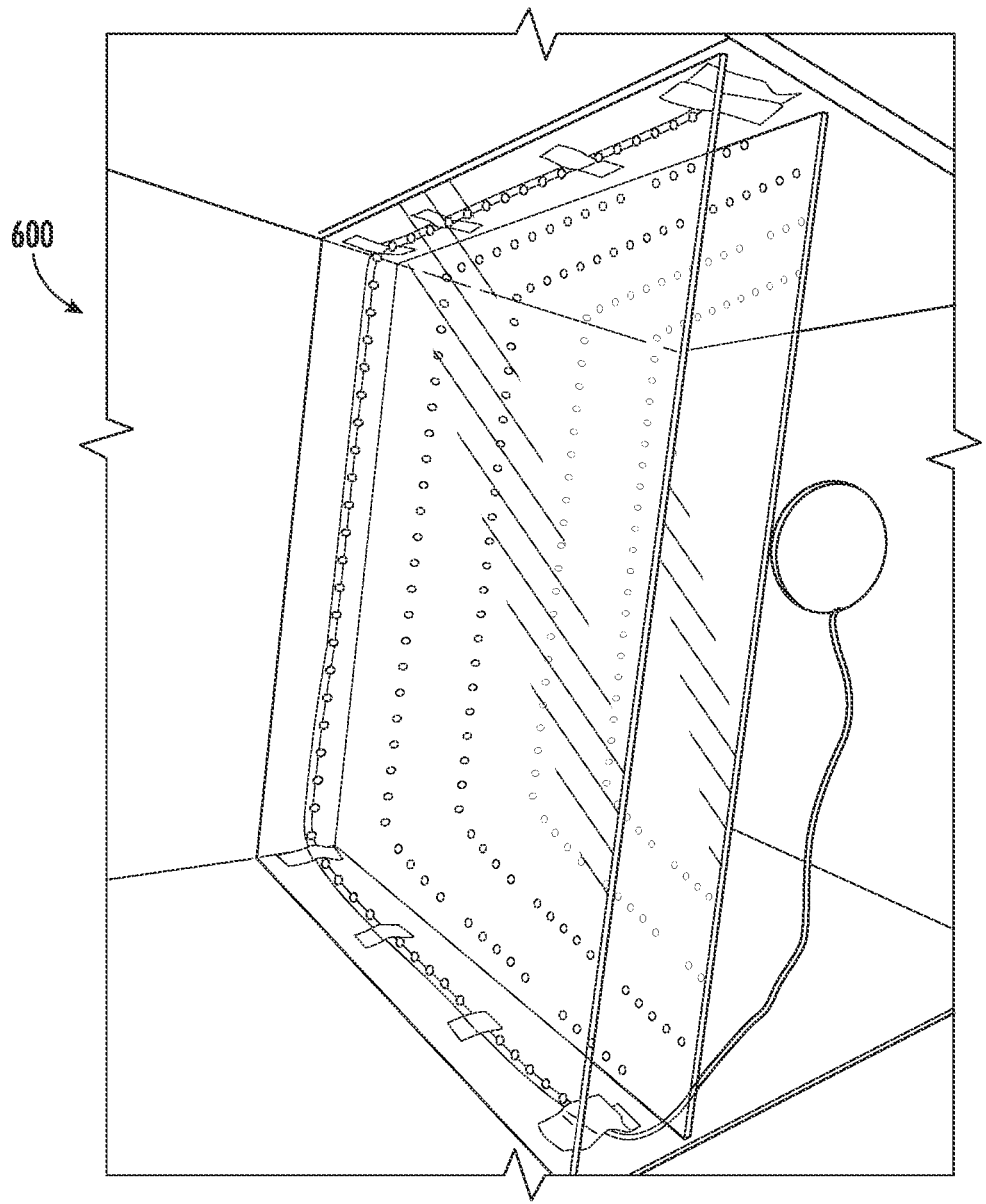
Figure 15B:
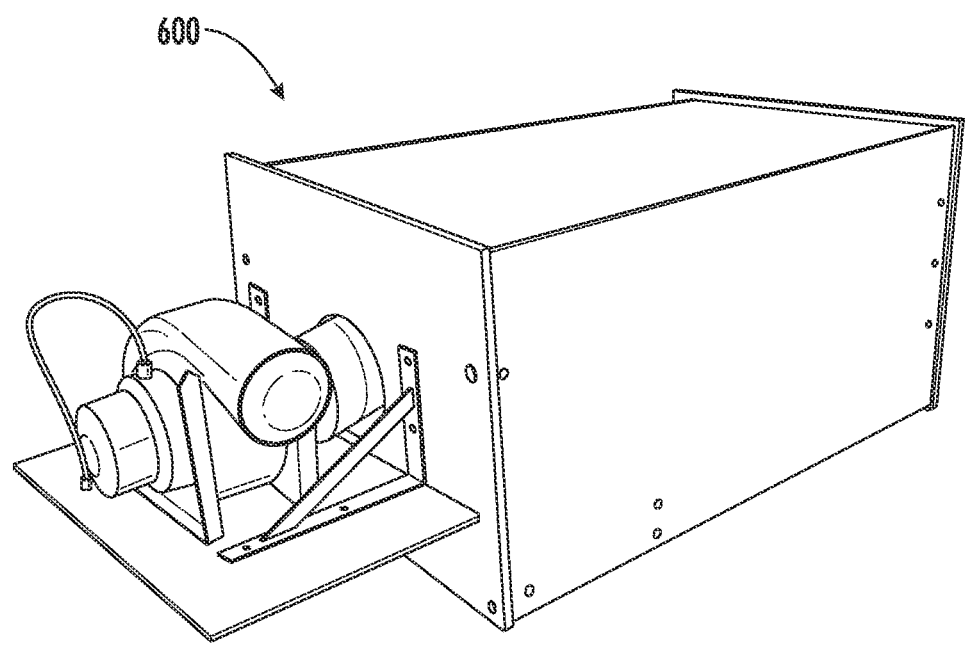
Figure 15C:
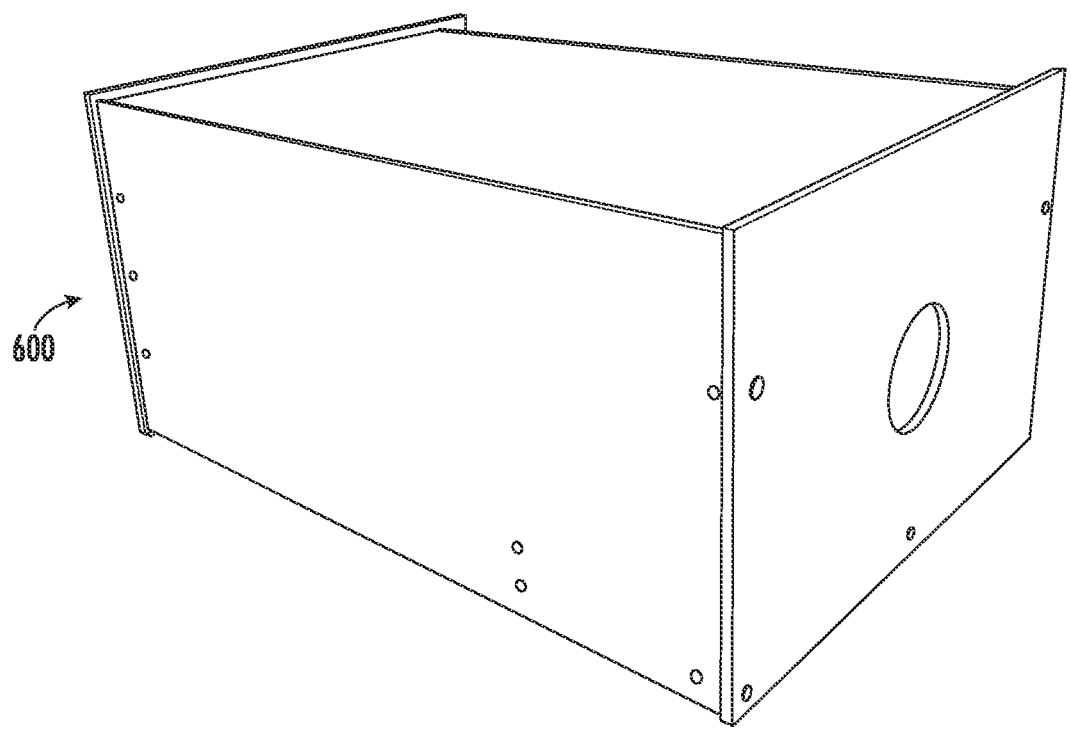
Figure 17A:
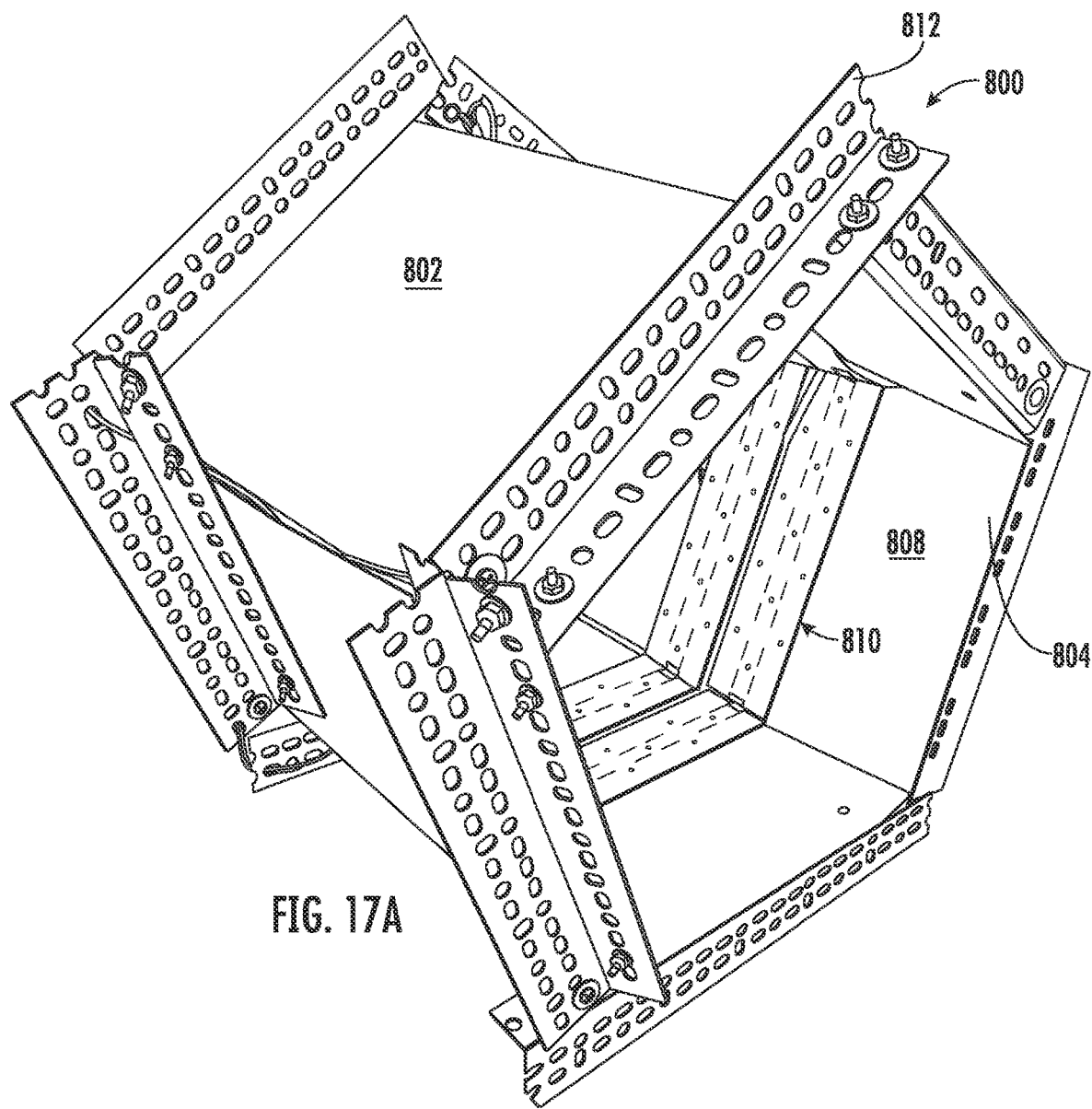
Figure 17B:
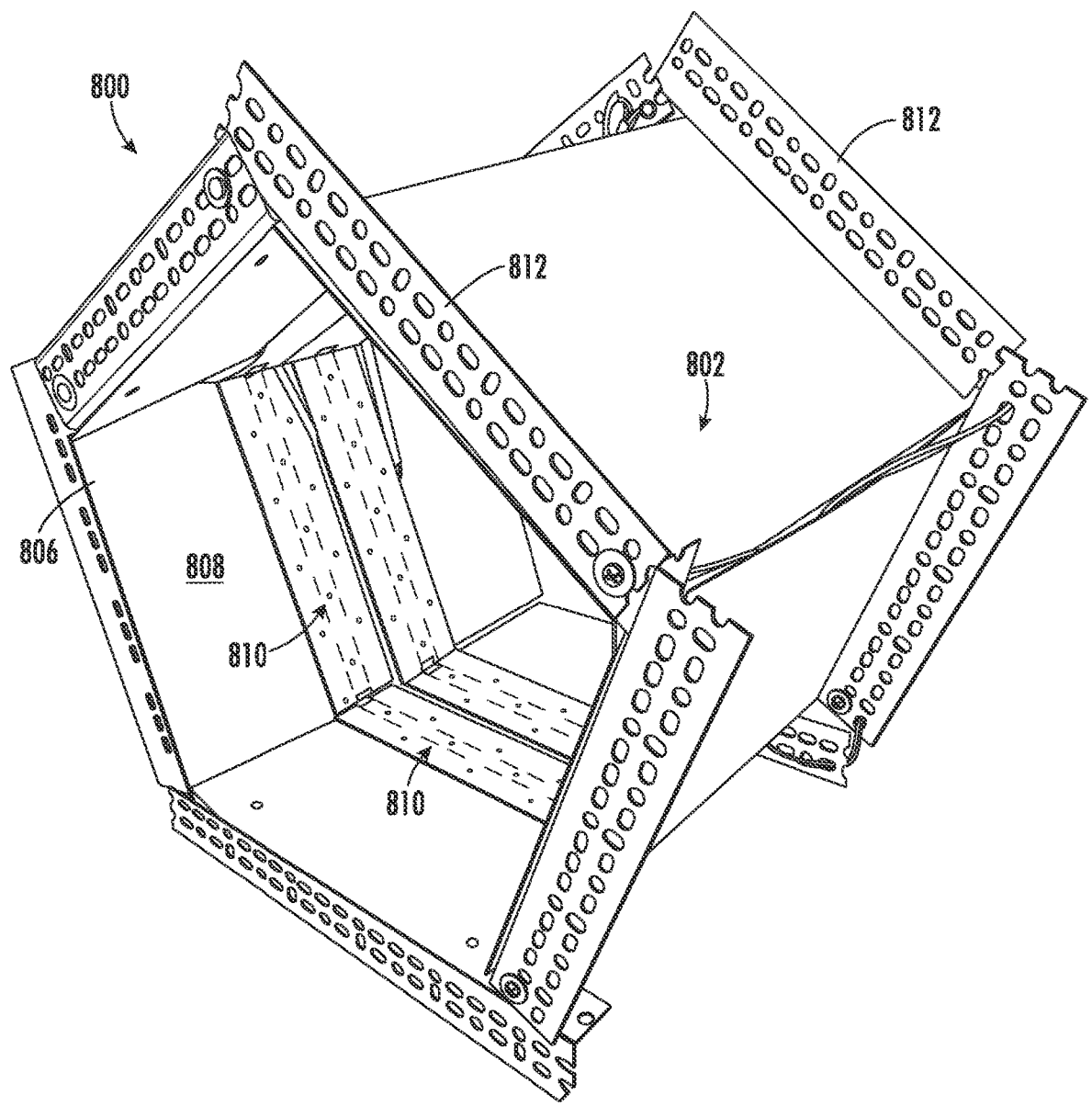
Figure 18:
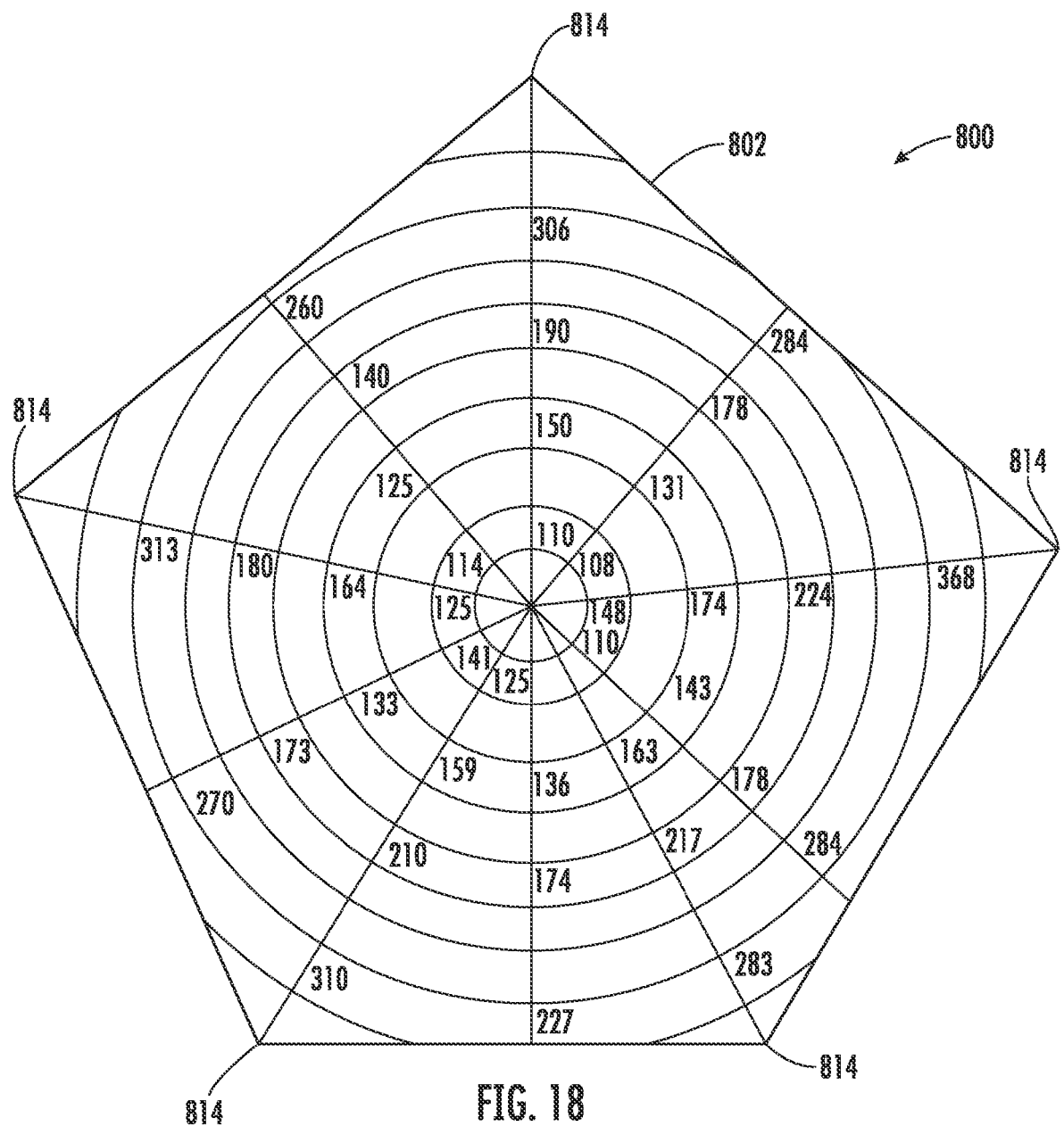
Figure 19:
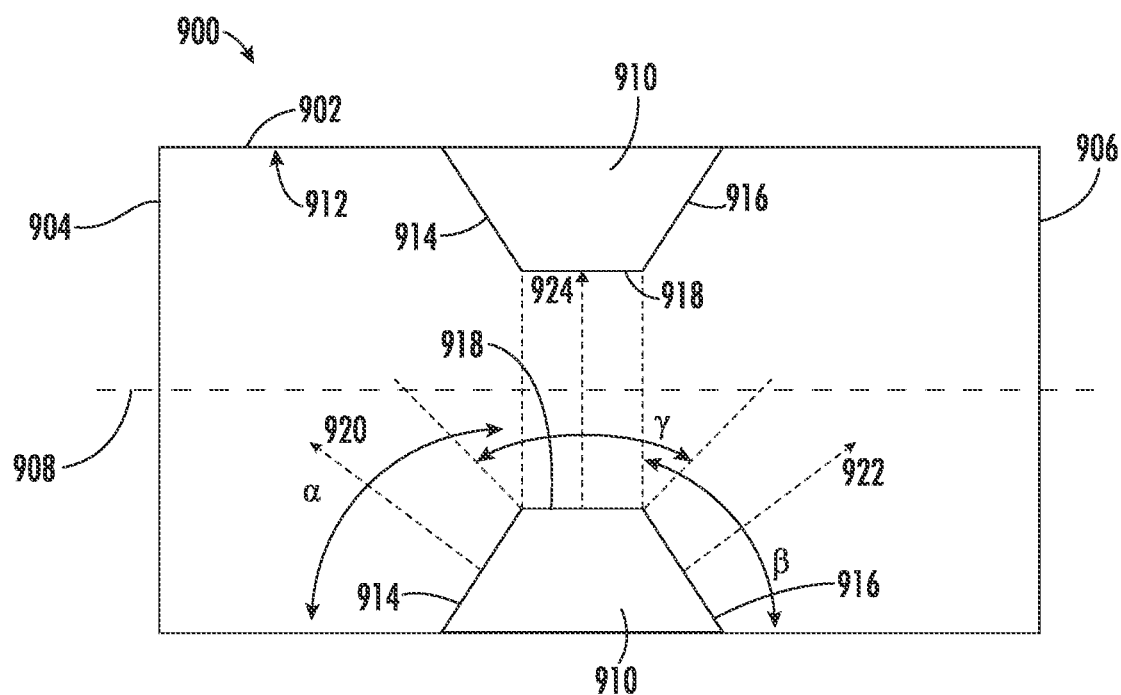

Having thus described some example embodiments in general terms, reference will now be made to the accompanying drawings, which are not necessarily drawn to scale, and wherein:

FIG. 1 is a schematic perspective view of a purification assembly according to an embodiment of the present invention;

FIG. 2 is a schematic top view of a purification assembly according to another embodiment of the present invention;

FIG. 3 is a schematic exploded view of the purification assembly of FIG. 2;

FIG. 4 is a block diagram of a purification assembly in accordance with an embodiment of the present invention;

FIG. 5 is a partial cross-sectional view of a resonating cavity that may be disposed within a purifier assembly in accordance with another embodiment of the present invention;

FIG. 6 is a flow chart illustrating steps of a method in accordance with an embodiment of the present invention;

FIG. 7 is an enlarged perspective view of the interior of a purification assembly in accordance with another embodiment of the present invention;

FIG. 8 is an enlarged perspective view of the interior of the purification assembly of FIG. 7;

FIG. 9 is an enlarged perspective view of the interior of the purification assembly of FIG. 7;

FIG. 10 is a perspective view of the purification assembly of FIG. 7, wherein the UV radiation sources are active;

FIG. 11 is an enlarged perspective view of the interior of the purification assembly of FIG. 7, wherein the UV radiation sources are active;

FIG. 12 is an enlarged perspective view of the purification assembly of FIG. 7, wherein the UV radiation sources are active;

FIG. 13A is a perspective view of a purification assembly in accordance with another embodiment of the present invention;

FIGS. 13B-13D are various perspective views of the purification assembly of FIG. 13A shown partially disassembled;

FIGS. 14A-14C are schematic views of a purification assembly in accordance with another embodiment of the present invention;

FIG. 15A is an enlarged perspective view of the interior of a purification assembly in accordance with another embodiment of the present invention;

FIGS. 15B-15C are perspective views of the exterior of the purification assembly of FIG. 15A;

FIGS. 16A-16D are schematic views of a purification assembly in accordance with yet another embodiment of the present invention;

FIGS. 17A-17B are perspective views of a purification assembly in accordance with another embodiment of the present invention;

FIG. 18 is a schematic cross-sectional view of the housing of the purification assembly of FIGS. 17A-17B showing exemplary measurements of the intensity of ultraviolet light at various radial locations on a cross sectional area within the housing; and FIG. 19 is a schematic cross-sectional view of the housing of a purification assembly according to another embodiment of the present invention.

Repeated use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of A and B," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Embodiments of the present invention comprise apparatus and methods for disinfecting, purifying, filtering, and/or cleaning a fluid (including but not limited to air) flowing in a duct. For example, some embodiments provide a purification assembly (or cartridge or unit) that is configured to be fluidly coupled inline with ductwork in an existing HVAC system. In some embodiments, the purification assembly includes one or more germicidal UV radiation sources operative to emit UV radiation into one or more resonating cavities through which air to be sanitized is flowed. As discussed herein, in some embodiments, the resonating cavity(ies) cause an increase in the intensity of the UV radiation and/or allow the UV radiation sources to provide a predetermined dose of radiation using less power than would otherwise be required. Further, in some embodiments, UV reflective interior surface(s) of a purification chamber may reflect and maximize captured UV radiation and provide a uniform light curtain. In some embodiments, the purification chamber includes an additive ultraviolet light curtain array employing ultraviolet light emitted from opposing sides of the interior surfaces of the purification chamber. In addition, some embodiments of purification assemblies comprise one or more plates disposed in the path of a fluid stream and operative to induce turbulence (e.g., a "tumble effect") in the fluid stream. In some embodiments, the one or more plates may comprise a photocatalyst. In other embodiments, the one or more plates may also serve as electrodes or as a collection plate in an electrostatic filter or precipitator. These and other inventive aspects of the present disclosure are discussed in greater detail below.

Certain embodiments are described below in the context of a residential HVAC system, but those of skill in the art will appreciate that the present invention is not so limited. For instance, embodiments of the present invention may be used in any suitable HVAC application, including but not limited to commercial and industrial HVAC systems. Additionally, embodiments are described herein as being disposed inline to HVAC ductwork, but other embodiments are contemplated that include purification assemblies that may be standalone, portable, and/or attached to or part of a movable unit. For example, in other embodiments, purification assemblies may be used in aerospace, automobiles and other vehicles, and other suitable applications. The terms "duct" and "ductwork" as used herein refer to any type of passageway for fluid familiar to those of skill in the art, including tubes, pipes, and channels.

Where a purification assembly in accordance with embodiments of the present invention is used in an HVAC system, it is contemplated that the purification assembly may be disposed on either the supply side or the return side of the system. Further, it can be used in either an upflow or a downflow configuration. In some embodiments, a purification assembly may be disposed within or coupled with air handling equipment (such as, but not limited to, an air handler, furnace, blower, or a plenum connected therewith), and in other embodiments, a purification assembly may be disposed within or coupled inline with ductwork either upstream or downstream (at any relative location) of the air handling equipment.

Turning now to FIGS. 1-4, embodiments of a purification assembly 100 are shown. In general, purification assembly 100 may comprise a housing 102 having an upstream end 104 and a downstream end 106. Housing 102 may be formed of any suitable material for use in HVAC applications that involve ultraviolet light, such as a suitable metal material (e.g., sheet metal). In some embodiments, housing 102 may also be formed of a suitable plastic or wood material. In various embodiments, it is contemplated that housing 102 may be rigid. In any event, housing 102 may be configured for being coupled between portions of a duct, such as a first, or upstream, portion 108 and a second, or downstream, portion 110 (FIG. 3). For instance, housing 102 may be "spliced" into a length of ductwork using known methods for attaching pieces of ductwork to one another.

When housing 102 is coupled between portions 108 and 110, portions 108 and 110 are in fluid communication through housing 102. In that regard, housing 102 preferably defines an interior volume 112 through which a fluid may flow from upstream end 104 to downstream end 106. As described in more detail below, in some embodiments, air in need of purification 114 may enter housing 102 from ductwork portion 108 and air that has been purified 116 may exit housing 102 into ductwork portion 110. In various embodiments, housing 102 may have any suitable cross-sectional shape, including circular, square, polygonal, etc. In one embodiment described below, for example, housing 102 may have a pentagonal cross-sectional shape. In other embodiments, the cross-sectional shape may be hexagonal, octagonal, etc. In some embodiments, the cross-sectional shape of housing 102 may correspond to the cross-sectional shape of the duct to which it is coupled.

Likewise, in various embodiments, purification assemblies may be scaled to the size (or cross-sectional dimensions) of the duct with which it is used. This may be done either dimensionally or in series for larger systems. Non-limiting examples of standard cross-sectional dimensions of a square duct may be 17.5" by 16.25"; 21" by 19.75"; and 24.5" by 23.25" (e.g., with reference to ductwork that may be attached to a furnace operating either in downflow or in upflow). As discussed in more detail below, however, the dimensions of resonating cavities that are part of a purification assembly 100 may depend, in part, on the wavelength of UV radiation used in purification assembly 100, and thus the resonating cavities may have dimensions that do not necessarily correspond to standard ductwork sizes.

Next, purification assembly 100, or housing 102 thereof, may define a longitudinal axis 118, for example extending between upstream end 104 and downstream end 106. Purification assembly 100 optionally may comprise one or more filters 120 that are disposed within interior volume 112 and arranged in the path of the flow of air 114. In other embodiments, filters 120 are not included at all. For instance, in some embodiments, a filter 120 may be positioned perpendicularly to longitudinal axis 118, though in other embodiments filter(s) 120 may be disposed at an angle thereto. Filters 120 may be shaped like a relatively thin plate in some embodiments and may have one or more peripheral edges that are in contact with the interior surfaces of housing 102. Filters 120 may be mounted within interior volume 112 using any suitable method, such as brackets, fasteners, a suitable adhesive, a retaining groove, or welding, or the like. Where filters 120 are not provided, other methods to delay the path of fluid flow through housing 102 may be used.

In various embodiments, a filter 120 may be formed of any suitable material and have a variety of configurations. Depending on the configuration, flowing fluid may pass around or through a filter 120, and the locations of filters 120 may be variable based on the size of the duct in which they are positioned. For instance, filters 120 may be formed of a metal mesh material in some embodiments. In other embodiments, filters 120 may be (or be analogous to) particulate air filters. In yet other embodiments, filters 120 may serve as a collection plate or surface within an electrostatic filter 122 that is a component of air purification assembly 100. In still other embodiments, filters 120 may be formed of a glass material.

In one presently preferred embodiment, a filter 120 used in purification assembly 100 may be or comprise a photocatalyst material. For example, a filter 120 may be impregnated with titanium dioxide in some embodiments, though in other embodiments other photocatalytic materials may be used. One example of a suitable filter 120 is the titanium dioxide impregnated glass sheets offered under the name "SaniTise" by Pilkington North America of Toledo, Ohio. As those of skill in the art will appreciate, titanium dioxide impregnated glass sheets may operate in accordance with the photocatalytic effect, using UV energy supplied by one or more UV radiation sources in purification assembly 100 and airborne moisture to generate reactive oxygen species. The reactive oxygen species may inactivate viruses and bacteria that are or become disposed on the surface of the glass. Accordingly, in various embodiments of the invention, filters 120 may be activated by a UV radiation source to serve as a redundant kill surface. The impregnated glass need not be in sheet form in all embodiments, however, and it will be appreciated that impregnated glass fibers or other arrangements also may be used.

In the illustrated embodiment, an upstream filter 120a, which may be disposed proximate upstream end 104, and a downstream filter 120b, which may be disposed proximate downstream end 106, are provided in purification assembly 100. In this embodiment, filters 120a, 120b are titanium dioxide impregnated glass sheets, and as such one or more apertures 122 are defined therein. As shown, in this embodiment one aperture 122 is defined in filter 120a, and four apertures 122 are defined in filter 120b. In various other embodiments, any number of apertures 122 may be defined in either or both of filters 120a, 120b. While apertures 122 are illustrated as being circular in shape, apertures 122 may have any suitable shape in other embodiments. In that regard, as described elsewhere herein, filter 120a and/or 120b may be configured to induce turbulence in air 114 entering interior volume 112, and the position, number, and shape of apertures 122 may be selected to induce a desired amount of turbulence. In many embodiments it is preferred that a purification assembly 100 negligibly affect (or at least not serve as a significant impediment to) the volume of airflow that would otherwise pass through a given duct. Thus, in some embodiments, the configuration of apertures 122 may be selected to minimize the impact on the amount of airflow passing through purification assembly 100. As those of skill in the art will appreciate, factors that influence the fluid dynamics of flowing fluid in purification assembly 100 include, among others, the dimensions of purification chamber(s) 124, the distance between filter(s) 120, the size/diameter, number, and location of any apertures 122. Those of skill in the art can adjust these features as necessary as appropriate for a given application.

Purification assembly 100 in this embodiment defines at least one purification chamber 124. As described in more detail herein, purification chamber(s) 124 may comprise one or more UV radiation sources 126 and, in some cases, one or more visible light sources 128. Purification chamber(s) 124 may also be or comprise one or more UV radiation resonating cavities in some embodiments, as described elsewhere herein.

In the illustrated embodiment, purification chamber 124 is defined on the top, bottom, and lateral sides by housing 102 and on the front and back by filters 120a, 120b, respectively. In various embodiments, however, additional filter(s) 120 may also be disposed upstream and/or downstream of purification chamber(s) 124. Additionally, in some embodiments, filters 120a, 120b may not define the front and back walls of purification chamber(s) 124, and the front and back walls of purification chamber(s) 124 may instead be defined by another structure. In some embodiments, purification chamber(s) 124 may not have front and back walls at all. Purification chamber(s) 124 may have a variety of standard sizes in some embodiments, such as 12" by 12" by 12"; 16" by 16" by 16"; 20" by 20" by 20"; and/or 36" by 36" by 36", or various combinations thereof. In other embodiments, such as where purification chamber(s) 124 are or comprise a resonating cavity, the dimensions of purification chamber(s) 124 may be selected based on the conditions needed to achieve a desired resonance of emitted UV radiation, including the distance traveled by the UV radiation and the wavelength of the UV radiation used, as described in more detail herein. In still other embodiments, also as described herein, the dimensions of purification chamber(s) 124 may be selected to reduce the distance between a UV radiation source 126 and an opposing, or target, surface to a distance that is below the minimum effective distance by a predetermined threshold.

In other embodiments, purification chamber(s) 124 may comprise a separate structure within housing 102. As shown in FIG. 4, in some embodiments, purification chamber(s) 124 may be removably mounted in a rack 130 disposed in housing 102 so that components in purification chamber(s) 124 may be accessed for cleaning or maintenance purposes. Because of the wide variety of different places ductwork may be installed, all of which may have differing degrees of accessibility (e.g., a crawlspace may have less access), it is contemplated that rack 130 may be any suitable rack, tray, sliding bracket, sliding drawer, or the like in various embodiments, as needed or desired to facilitate access to the purification assembly in a given setting. In certain embodiments, for example, housing 102 may also comprise a door 132 pivotably attached thereto and movable between a closed position, in which components of purification chamber(s) 124 are not accessible, and an open position, in which components of purification chamber(s) 124 are accessible. Door 132 may pivot up, down, or swing horizontally (e.g., analogous to a cabinet door) in various embodiments.

UV radiation sources 126 and visible light sources 128 may be any suitable UV radiation and visible light sources familiar to those of ordinary skill in the art. In various embodiments, both UV radiation sources 126 and visible light sources 128 may comprise one or more solid state light sources, such as light-emitting diodes (LEDs), though in other embodiments bulbs or other light sources may also be used. UV radiation sources 126 and/or visible light sources 128 may be disposed on one or more printed circuit boards (PCBs) positioned within interior volume 112 in some embodiments, though this is not required. In other embodiments, suitable driving circuitry for UV radiation sources 126 and/or visible light sources 128 may be disposed outside of housing 102.

Where solid state UV light sources, for example LEDs, are used for UV radiation sources 126, suitable examples include the UV LEDs offered by Seoul Semiconductor or Nichia Corporation. In various embodiments, it is preferred that the wavelength of UV radiation used be between about 100 nanometers and 280 nanometers. In some embodiments, the UV radiation used is germicidal UV at a wavelength that destroys or alters the DNA of microorganisms, rendering them non-reproductive. In some embodiments, the wavelength of UV radiation used may be between about 180 nanometers and 450 nanometers. In some embodiments, the wavelength of UV radiation used may be about 250 nanometers. In some embodiments, the wavelength of UV radiation emitted may be about 254.7 nanometers. Any number of UV radiation sources 126 may be provided in purification chamber 124, as needed to achieve a desired UV radiation intensity, fluence, or dose. (The fluence rate can be measured, for example, using a calibrated radiometer to assess whether a required fluence to either exterminate airborne pathogens or render them unable to replicate is being met.) As described elsewhere herein, however, in certain embodiments where purification chamber 124 is or comprises a resonating cavity for UV radiation, fewer UV radiation sources 126 may be needed to achieve a desired UV radiation intensity, fluence, or dose. Also, those of skill in the art will appreciate that the presence of multiple UV light sources may have an additive effect on the intensity of UV radiation in the purification chamber. Where solid state light sources, for example LEDs, are used for visible light sources 128, a suitable light source includes the LED snap panels offered by Tresco Lighting. In other embodiments, LEDs offered by other manufacturers, and which may be provided on single boards rather than snap panels, also may be used. In one embodiment, 240 or more UV LEDs may be provided. In some embodiments, UV LEDs may be disposed on flexible PCBs that may bend or flex to follow the contour of an interior surface of a purification assembly housing.

Referring to FIG. 4, UV radiation sources 126 and visible light sources 128 are powered by and are configured for electrical communication with any suitable power source(s) 134. In one embodiment, purification assembly 100 comprises its own 24V DC power source 134 that is separate from that used to power air handling equipment 136. Power source(s) 134 may be grounded as is well-understood to avoid buildup of static charges that could damage UV radiation sources 126 and/or visible light sources 128. UV radiation sources 126 and/or visible light sources 128 may also comprise an electrostatic discharge (ESD) mounted on their associated PCBs. In some embodiments, power source(s) 134 may also be or comprise a battery, capacitor, or other energy storage device. In some embodiments, power source(s) 134 may comprise multiple power supplies.

Additionally, purification assembly 100 may comprise an interlock 138. Interlock 138 may comprise one or more switches, including microswitches, electronic switches, or other suitable switches or safety devices familiar to those of skill in the art, operative to disconnect power to the components of purification chamber(s) 124 in certain conditions. For example, as shown in FIG. 4, when door 132 is opened, a switch of interlock 138 may also be opened to thereby disconnect power from purification chamber(s) 124. As another example, when power is disconnected from air handling equipment 136, then via interlock 138, power may also be disconnected purification chamber(s) 124. When this occurs, UV radiation is not emitted from UV radiation sources 126. In some embodiments, interlock 138 may be configured for use in a "lock out tag out" safety protocol familiar to those of skill in the art.

In general, in various embodiments, UV radiation sources 126 and/or visible light sources 128 may be coupled with one or more interior surfaces of housing 102, such as a left side, right side, bottom side, and/or top side surface thereof. Any suitable mounting technique, including fasteners, LED strips having adhesive backing, or magnetic means, may be used.

In various embodiments, any suitable configuration and/or orientation of UV radiation sources 126 may be used. In various embodiments, the UV radiation sources 126 may emit light individually or collectively in a uniform or in a non-uniform fashion. In one embodiment, UV radiation sources 126 may be configured to emit UV radiation in a uniform array or light curtain. In one embodiment, one or more UV radiation sources 126 and/or visible light sources 128 may be oriented to face a direction perpendicular to longitudinal axis 118. In other words, a beam of electromagnetic radiation emitted from a given UV radiation source 126 and/or visible light source 128 may define a beam axis that is perpendicular or substantially perpendicular to longitudinal axis 118. As those of skill in the art will appreciate, the beam may have a variety of different beam widths, depending on the type of radiation source used, among other things. In other embodiments, one or more UV radiation sources 126 and/or visible light sources 128 may be oriented at an angle to longitudinal axis 118. In such embodiments, a beam of electromagnetic radiation emitted from a given UV radiation source 126 and/or visible light source 128 may define a beam axis that is at an angle relative to longitudinal axis 118, but the beam will have a beam width that emits light over an angle that may vary depending on a variety of factors familiar to those of skill in the art.

In some embodiments, where UV radiation sources 126 are disposed on two surfaces that are in facing opposition to one another, the UV radiation sources 126 may be out of alignment, or slightly offset, on one surface relative to their position on the opposing surface. In some embodiments, UV radiation sources 126 may provide an array of light emitted from one or more slight concave or convex beams so that emitted UV waves cross one another. In some embodiments, multiple UV radiation sources 126 may be mounted on a slight concave or convex surface. In some embodiments, UV radiation sources 126 may comprise or be used with optical elements that focus the beam(s) emitted therefrom onto a specific or concentrated area.

In some embodiments where filter(s) 120 are formed from a glass material, filter(s) 120 may be edge-lit by one or more UV radiation sources 126. In various embodiments, edge lit glass filter(s) 120 will scatter the light and make the glass surface illuminate, which may provide another element as an airborne organism elimination point. In such embodiments, solid state light sources, such as UV LEDs, can be positioned around two opposing edges, or all four edges, of a given filter 120. The glass edges may be polished for maximum light transmission (versus simple cut glass which may not provide a smooth flat surface) in some embodiments. In some embodiments, the glass material may have etched front and/or back surfaces. Such etching may provide surface texture for an additional illumination component. In some embodiments, this may be achieved with a chemical etching which will penetrate the surface of the glass by a few micrometers and produce a textured side.

Purification assemblies in accordance with various embodiments may be configured to induce turbulence in the fluid that is entering interior volume 112. By inducing turbulence, it is contemplated that viruses, bacteria, and other microorganisms carried in the fluid may be exposed to UV radiation on multiple, or all, sides and may be more likely to be killed or neutralized thereby. In other words, for a given dwell time within (or time that it takes for turbulent air to pass through) purification chamber 124, viruses, bacteria, and other microorganisms may receive more UV radiation. As shown in FIG. 2, air to be purified 114 entering interior volume 112, after passing through aperture 122 of filter 120a becomes turbulent air 140 in purification chamber(s) 124. In some embodiments, apertures 122 of filter 120b may be configured (in diameter, number, and/or position) to reduce turbulence in purified air 116.

In this regard, purification assembly 100 may also comprise one or more plate(s) 142 disposed within housing 102. Plate(s) 142 may be configured to induce turbulence in the fluid entering interior volume 112. Plate(s) 142 may also define one side of purification chamber(s) 124 in certain embodiments. However, plate(s) 142 are optional and may not be provided in all embodiments.

Plate(s) 142 may be positioned parallel with longitudinal axis 118, though in other embodiments plate(s) 142 may be disposed at an angle thereto. Also, in various embodiments, housing 102 need not be straight and may instead be curved, in which case plate(s) 142 may also have a radius of curvature that follows that of housing 102. Plate(s) 142 may be shaped like a relatively thin plate in some embodiments and may have one or more peripheral edges that are in contact with the interior surfaces of housing 102. As shown in FIG. 1, plate 142 has top and bottom edges that are in contact with housing 102, and it has upstream and downstream edges that are disposed slightly downstream of filter 120a and slightly upstream of filter 120b, respectively. In contrast, as shown in the embodiment of FIG. 2, plate 142 may be longer such that the upstream and downstream edges thereof are adjacent and/or in contact with filters 120a, 120b. Where provided, plate(s) 142 may be mounted within interior volume 112 using any suitable method, such as brackets, fasteners, a suitable adhesive, a retaining groove, or welding, or the like.

In various embodiments, a plate 142 may be formed of any suitable material and have a variety of configurations. Depending on the configuration, flowing fluid may pass around or through a plate 142. For instance, a plate 142 may be formed of a metal material in some embodiments, such as sheet metal, and may be solid or porous. In other embodiments, plate(s) 142 may be (or be analogous to) particulate air filters. In yet other embodiments, plate(s) 142 may serve either as an electrode or collection plate or surface within an electrostatic filter 122 that is a component of air purification assembly 100. In still other embodiments, plate(s) 142 may be formed of a glass material, including the titanium dioxide impregnated glass materials described above.

In embodiments of purification assembly 100, it is contemplated that the distance between at least some (and in some cases, all) UV radiation sources 126 and an opposing, or target, surface may be selected to be less than the minimally effective distance (for germicidal purposes, for example) by a predetermined threshold. In other words, in some embodiments, some or all UV radiation sources 126 may be closer to their respective opposing surfaces than is required for the UV radiation to be effective for germicidal purposes. In certain embodiments, UV radiation sources 126 may be about 50% closer to an opposing surface than is required for minimal effectiveness, though other thresholds are contemplated. As those of skill in the art will appreciate, this configuration will increase the intensity of the UV radiation received by viruses, bacteria, and other microorganisms suspended in the fluid flowing through purification chamber(s) 124.

For example, with reference to FIGS. 1-3, some UV radiation sources 126 may be coupled with each of the interior lateral walls of housing 102 (or of purification chamber(s) 124) in facing opposition to either side of plate 142. The distance between plate 142 and these UV radiation sources 126 may be closer than is required for minimal effectiveness by 50% or more. In one non-limiting example, the distance between UV radiation sources 126 and plate 142 may be about 8". Additionally, in this embodiment, UV radiation sources 126 may also be coupled with either or both sides of plate 142 in facing opposition to either lateral side of housing 102 (or of purification chamber(s) 124). In various other embodiments, UV radiation sources 126 may be coupled with any interior surface of housing 102 and/or purification chamber(s) 124.

Further, in some embodiments, purification chamber(s) 124 may comprise interior surface(s) that efficiently reflect UV radiation. For instance, at least the surfaces that are in facing opposition to UV radiation sources 126 may be UV reflective. In some embodiments, the entire interior volume of each purification chamber 124 may be UV reflective. As those of skill in the art will appreciate, reflection of emitted UV radiation off of UV reflective surfaces may increase the intensity of UV radiation in purification chamber(s) 123. Additionally, as described in greater detail herein, in some embodiments UV reflective surfaces in purification chamber(s) 124 may facilitate resonance of UV waves.

The interior surfaces of purification chamber(s) 124 themselves (including top, bottom, side, front, and/or back walls) may be formed from a UV reflective material, or they may have a UV reflective media 144 applied thereto. In this regard, depending on the distance an airborne particle is from a source of UV radiation, it will receive a different dose of radiation as it passes through a purification assembly than a particle that is closer to the source of UV radiation. By using a UV reflective material in various embodiments, particles that are farther away from the source(s) of UV radiation may receive higher doses (and thus may be more likely to be neutralized or eliminated) than they would without the UV reflective material. In various embodiments, use of a UV reflective material and/or UV reflective media 144 may facilitate the creation of a uniform light curtain of UV radiation within purification chamber(s) 124.

Those of skill in the art can select suitable UV reflective materials for this purpose, including suitable UV reflective paints and films. In one embodiment, a Polytetrafluoroethylene (PTFE) film may be applied to one or more interior surfaces of purification chamber(s) 124. A highly reflective PTFE film may have about 93% average reflectance in some embodiments, whereas an aluminum surface may have only a 60% average reflectance. In some embodiments, use of PTFE film may achieve approximately 50% or more reflectance than the use of an aluminum surface, which may result in an increased dose of UV radiation. For example, in certain embodiments the PTFE film used may be an omnidirectional, diffusely reflective PTFE film with an adhesive backing used in UV sterilization applications. In various embodiments, though, the UV reflective media 144 may have or provide either specular or diffuse, reflection, or degrees thereof. In various embodiments, the surface of the PTFE film (and/or that of other UV reflective media 144) may be smooth or flat, or it may have various textures. The surface of the PTFE film (and/or that of other UV reflective media 144) may be dimpled (e.g., analogous to the surface of a golf ball) in some embodiments. A dimpled surface may provide light scatter and/or a specular reflection effect that may prove to be more effective than a flat surface in some embodiments.

As mentioned above, in some embodiments, purification assembly 100 may also optionally comprise an electrostatic filter 122. Where this is the case, one or more filter(s) 120 may additionally operate as a collection plate or surface of the electrostatic filter 122. In this regard, as shown, power source(s) 134 may be configured to positively charge either filter(s) 120 and/or plate(s) 142. Power source(s) 134 may also be configured to negatively charge one or more rods or wires, through which air to be purified 114 may pass. Power source(s) 134 may create a significant potential difference between the electrodes sufficient to create an electrostatic field. As those of skill in the art will appreciate, particles in the air to be purified may be negatively charged as they pass the negatively charged wires or rods, and as they pass the positively charged surface(s) (e.g, either of filter(s) 120 and/or plate(s) 142), they may be pulled from the air toward the positively charged surface via electrostatic forces. In some embodiments, the particles may collect on the positively charged surface. In other embodiments, a dielectric material may be positioned between the negatively charged wires or rods and the positively charged surface, such that the particles may collect on the dielectric material. In some embodiments, it is contemplated that one or more filters 120 comprising impregnated titanium dioxide glass may serve as the dielectric material upon which negatively charged particles collect. (In that case, plate(s) 142 may serve as the positive electrode(s) of the electrostatic filter.) As discussed above, when activated by UV radiation, such glass may serve to inactivate viruses, bacteria, etc. that collect on the surface of the glass.

In some embodiments, it is possible that one or more filter(s) 120 and/or plate(s) 142 may develop an excess of positive or negative charge during operation of the system. Accordingly, in some embodiments, the filter(s) 120 and/or plate(s) 142 may be electrically connected with a ground to remove the buildup of excess charge.

With reference now also to FIG. 5, as noted above, in some embodiments of purification assemblies in accordance with the present invention, a purification chamber may be or comprise a resonating cavity. As shown in cross-section in FIG. 5, a resonating cavity 200 comprises a top wall 202, a bottom wall 204, a side wall 206, and a side wall 208 that together define an interior volume 210 through which a fluid may be flowed. In some embodiments, resonating cavity 200 may be enclosed by additional walls, e.g., filters 120, upstream and downstream thereof (i.e., above and below the page in FIG. 5). Also as noted above, resonating cavity 200 may be defined in some cases by the housing of a purification assembly and its internal filters, or it may be a separate structure within the purification assembly (e.g., to allow the housing to correspond to the size of a standard duct). In this embodiment, each of walls 202, 204, 206, and 210 comprises a UV reflective surface 212. As discussed above, in some embodiments, UV reflective surface 212 may be or comprise a PTFE film.

Here, a UV radiation source 214 is coupled with top wall 202, and a UV radiation source 216 is coupled with side wall 208. As shown, UV radiation sources 214, 216 may be recessed in some embodiments. In other embodiments, UV radiation sources may extend from and/or be disposed on UV reflective surface 212. In still other embodiments, UV radiation sources 214, 216 may be disposed behind top wall 202 and side wall 208, respectively, and may emit UV radiation therethrough.

In this example, UV radiation sources 214, 216 may be one or more solid state light sources, such as UVC LEDs, having a peak wavelength ($\lambda$) of 254.7 nanometers. The round-trip distance UV radiation emitted from UV radiation source 214 travels from top wall 202 to bottom wall 204 and back is given by the dimension 2*D1, and the round-trip distance UV radiation emitted from UV radiation source 216 travels from side wall 208 to side wall 206 and back is given by the dimension 2*D2. In various embodiments, the round-trip distances 2*D1 and 2*D2 are selected such that they are equal to an integer number N wavelengths of the UV radiation. For example, where $\lambda$=254.7 nm, 2*D1 and 2*D2 may both be equal to 25.47 cm. (In other embodiments, D1 and D2 may have different values from one another.)

In various embodiments, resonating cavity 200 may achieve an increase in the intensity of the UV radiation and/or it may facilitate the delivery of a given fluence of UV radiation using less power than would otherwise be required. In various embodiments, resonating cavity 200 may provide a uniform light curtain of UV radiation. In various embodiments, resonating cavity 200 may create the conditions for standing waves to occur at one or more resonant frequencies due to interference between the oppositely moving UV radiation waves. The above-described relationship, where 2*D1 (or 2*D2) is equal to N*λ, creates a condition for resonance to occur. Additionally, in some embodiments, standing waves may occur where the emitted UV wave is in phase with the reflected UV wave, or where the phase difference between the two waves is an even multiple of π radians, such that the waves self-reinforce. In various embodiments, because the standing waves may have greater amplitudes, and the intensity of the UV radiation will increase.

As those of skill in the art will appreciate, in resonating cavities in accordance with embodiments of the present invention, the various resonant frequencies at which the standing waves occur are multiples of the frequency of the UV radiation. If the velocity of the UV radiation through the fluid passing through radiation cavity 200 is v (m/s), then a given resonating frequency f can be calculated by the formula:

$$f = \frac{Nv}{2d}$$

where d is the dimension D1 or D2 (in meters) and N is the integer number in this example.

In constructing resonating cavity 200 in accordance with various embodiments of the invention, one of skill in the art may take certain factors into account. For example, a given resonant frequency of the emitted UV radiation may have a different wavelength than that of the emitted UV radiation. The resonant frequencies achieved should not be large enough to change the wavelength beyond a wavelength that is effective at eliminating or inactivating airborne pathogens. On the other hand, in various embodiments, the resonant frequency(ies) of UV radiation achieved also should be high enough to create a meaningful increase in intensity of the emitted UV radiation.

Embodiments of the present invention also provide various methods. Examples of the methods performed in accordance with embodiments of the present invention are provided herein. One such method is described below with reference to FIG. 6. In this embodiment, the method involves a purification assembly comprising resonating cavity 200. However, upon review of other purification assembly embodiments described herein, those of skill in the art will appreciate and understand other methods that may employ other purification assembly embodiments. Such other methods are expressly contemplated and within the scope of the present invention.

Turning to FIG. 6, the method begins at operation 250. At operation 252, the method comprises the operation of providing a resonating cavity. The resonating cavity comprises a first wall and an opposite second wall, wherein the first and second walls comprise a UV reflective material; and at least one ultraviolet (UV) radiation source configured to emit a beam of UV radiation from one of the first wall and the second wall toward the other of the first wall and the second wall. Next, at operation 254, the method comprises the operation of coupling the resonating cavity inline with a duct. At operation 256, the method comprises flowing a stream of air through the duct toward the resonating cavity. Then, at operation 258, the method comprises emitting ultraviolet radiation at a first wavelength from the at least one UV radiation source such that the UV radiation is reflected between the first and second walls. At operation 260, the method comprises the resonating cavity having at least one resonant frequency at which interference between the reflected UV radiation and the emitted UV radiation generates standing waves. At operation 262, the method ends.

FIGS. 7-15C illustrate a number of additional aspects of embodiments of the present invention. Turning first to FIGS. 7-12, FIG. 7 is an enlarged perspective view of the interior of a purification assembly 300 in accordance with another embodiment of the present invention. In certain respects, purification assembly 300 may be analogous to purification assembly 100 described above. FIGS. 8 and 9 are enlarged perspective views of the interior of purification assembly 300. In FIGS. 7-9, the interior of purification assembly 300 is seen wherein visible light sources 302 are active and UV radiation sources 304 are inactive. FIG. 10 is a perspective view of purification assembly 300, and FIGS. 11-12 are enlarged perspective views of the interior of purification assembly 300. In FIGS. 10-12, visible light sources 302 are inactive and UV radiation sources 304 are active. In FIGS. 11-12, reflection of UV radiation from reflective film 306 is visible.

Turning now to FIGS. 13A-13D, an embodiment of a purification assembly 400 is shown. FIGS. 13B-13D show purification assembly partially disassembled. As shown, purification assembly 400 in this embodiment may comprise a housing 402 that is circular in cross section and which may have cross-sectional diameters that vary along its length. Further, in this embodiment, purification assembly 400 also comprises a textile filter 404 and filters 406 that are located upstream (FIG. 13B) and downstream (FIG. 13C) of an ultraviolet radiation source 408. Filters 406 comprise a metal mesh.

Next, FIGS. 14A-14C are schematic representations of another embodiment of a purification assembly 500 that comprises a first section 502, a second section 504, and a third section 506. In the embodiment shown in FIG. 14A, first section 502 comprises de-ionization of inflowing fluid, section 504 comprises killing and/or neutering of microorganisms in the inflowing fluid, and section 506 comprises an outlet that causes a vortex or spin of the outflowing fluid. In the embodiment shown in FIGS. 14B-14C, first section 502 comprises one or more filters, such as a textile filter and one or more metal filters. Second section 504 comprises an LED/UVC kill zone, and third section 506 also comprises one or more filters.

FIGS. 15A-15C illustrate aspects of another embodiment of a purification assembly 600. Among other things, these Figures illustrate reflection and amplification of visible LED light using glass panels. This embodiment also illustrates additional mounting methods for glass panels.

Purification assemblies in accordance with various embodiments are safe for residential, commercial, and industrial spaces because they are out of proximity of inhabitants of the spaces, such as being inline with a duct. Various embodiments may improve people's health and eliminate disease residing in areas humans inhabit or reside through a clean air system by eliminating and altering the DNA of airborne viruses, spores, bacteria, and other airborne organisms.

In certain embodiments, purification assemblies may be easily mountable as "plug and play" systems by splicing them into an HVAC duct, inserting and sealing them with standard methods familiar to those of ordinary skill in the art and as appropriate for the type of duct used. Thus, embodiments of the present invention are easily adaptable to various applications. Various embodiments also are easy to maintain via, for example, removable purification assemblies that are accessible from any desired side of a duct. In various embodiments, a purification assembly can be accessed, for example, from the bottom, a side, panel, etc., as needed or desired.

Turning now to FIGS. 16A-16D, another embodiment of a purification assembly 700 is shown. In this embodiment, purification assembly 700 comprises a housing 702 having an upstream end 704 and a downstream end 706. As shown, in this embodiment, housing 702 has a pentagonal cross-sectional shape. In various embodiments, a pentagonal-shaped housing cross-section may be preferred over a square-shaped housing cross-section, in that UV radiation may not reach each interior corner of a square-shaped housing. In some embodiments, a circular-shaped housing cross-section with UV radiation sources disposed in one or more rings about the entirety of the interior surface of the circular housing may maximize UV radiation intensity.

As shown, housing 702 is coupled between an upstream portion 708 of a duct 710 and a downstream portion 712 of duct 710. Purification assembly 700 also comprises a plurality of UV radiation sources 714 that are operative to emit UV light 716. Here, UV radiation sources 714 are coupled with each of the five interior surfaces of the pentagonal housing 702, although that is not required in all embodiments. UV light 716 is emitted radially inward toward the center of the pentagonal cross-section. As those of skill in the art will appreciate, the different cross-sectional shape of housing 702 relative to the duct to which it is coupled may induce a degree of turbulence in the air, which may result in targets tumbling and being exposed to UV radiation on all sides. This may also increase the dwell time of targets within housing 702. (As noted above, additional baffles or turbulence structures inside the chamber at entrance/exit and center may be added to alter airflow as needed to meet dwell time requirements or balance the system's CFM operating range.)

Figure 16A:
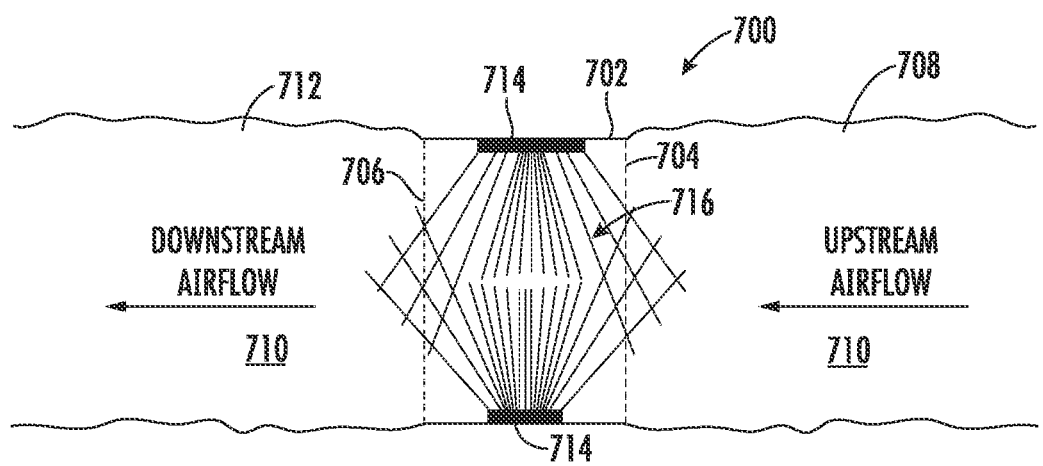
Figure 16B:
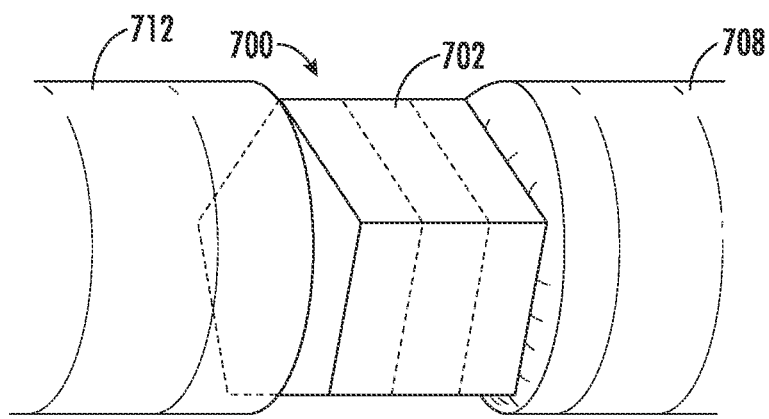
Figure 16C:
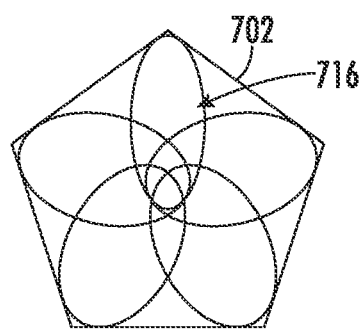
Figure 16D:
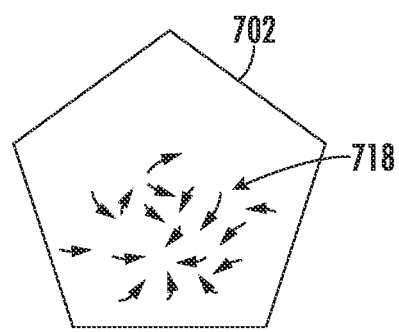

The cross-sectional view of FIG. 16C schematically illustrates example patterns of emitted UV light 716 from UV radiation sources 714. In general, the emitted UV light 716 is expected to be more intense at radial locations that are closer to the UV radiation sources 714. As shown, however, the emitted UV light 716 from the one or more UV radiation sources 714 disposed on one interior side of the pentagonal housing overlaps with emitted UV light 716 from the one or more UV radiation sources 714 disposed on adjacent interior sides of the pentagonal housing. This contributes to an additive effect at inward radial locations that are farther away from UV radiation sources 714 so that the intensity of UV light 716 at these locations exceeds the intensity at these locations that could be achieved from a single UV radiation source 714. The cross-sectional view of FIG. 17D schematically illustrates targets 718 of UV radiation tumbling as they flow through housing 714, for example due to turbulence that may exist or be induced in the fluid passing through housing 714. Targets 718 may be dust, virus, bacteria, mold, and/or other microorganisms, or the like.

FIGS. 17A-18B are perspective views of a purification assembly 800 according to another embodiment of the present invention. Purification assembly 800 in this embodiment is shown uncoupled from a duct. Purification assembly 800 comprises a housing 802 having a first opening 804 and an opposite second opening 806. In this embodiment, housing 802 also is pentagonal in cross-section and comprises five interior surfaces 808. UV radiation sources 810 are coupled with each interior surface 808. Housing 802 is formed from sheet metal in this embodiment, and metal angles 812 may be coupled at each end 804, 806 to facilitate coupling housing 802 with a duct. In this embodiment, interior surfaces 808 do not comprise a PTFE film, and assembly 800 also does not comprise any filter(s) or plate(s), though these features may be provided in other embodiments.

FIG. 18 is a schematic cross-sectional view of the housing 802 of purification assembly 800. In FIG. 18, measurements (in microwatts/cm^2) of the intensity of ultraviolet light are shown at four radial locations relative to each interior surface and relative to each interior corner along a plane that is perpendicular to the longitudinal axis of housing 802 and centered on the UV radiation sources 714 (e.g., the beam axes of UV radiation sources 714 extend along the plane in which measurements were taken). Moving from an interior corner 814 of housing 802 inward toward the center 816 of housing 802, each circular line in this Figure has a radius that decreases in size by about 1". For example, the interior corner 814 may have a radial distance of about 10" from center 816.

In one example, the measurements shown in FIG. 18 can be obtained using the following methodology. A UVC meter mounted to the end of a pole is supported by a fixture on both sides of the purification assembly housing. The fixture permits the UVC meter to be positioned at various radial locations relative to the housing's interior surfaces, and the UVC meter is extendable longitudinally between about 4' from the airflow entrance, through the housing interior, and about 4' from the airflow exit. The pole is rotatable about 360 degrees to enable measurements in all directions. As a result, the pole can be indexed longitudinally in and out of the housing and moved radially inward and outward to generate a three-dimensional matrix of measurements.

The table below shows the average intensity of ultraviolet light at various distances from the interior corners of housing 802 and from the interior surfaces of housing 802. As there is greater overlap at the interior corners between UV light emitted from each interior surface of the housing 802, the intensity of UV light is higher at those locations.

|    | From Interior Corner | From Interior Surfaces |
|----|----------------------|------------------------|
| 3" | 316 µW/cm$^2$        | 265 µW/cm$^2$          |
| 5" | 202 µW/cm$^2$        | 167 µW/cm$^2$          |
| 7" | 162 µW/cm$^2$        | 133 µW/cm$^2$          |
| 9" | 130 µW/cm$^2$        | 118 µW/cm$^2$          |

The measurements in the table above are based on UV radiation sources operating at 12 volts DC. It will be appreciated that UV radiation sources operating at increased voltage levels (e.g., 24 volts DC) will yield higher intensities. In example measurements with UV radiation sources operating at 24 volts DC, the intensities are between about 3 and 5 times higher than those shown in the table above. The intensities in the table above and in various embodiments within the scope of the present invention are greater than those that are achievable with a conventional single UV bulb that is inserted into a duct. Likewise, the intensities in the table above and in FIG. 18 are uniformly (e.g., across an entire cross-sectional area of the purification assembly housing) above a threshold intensity (e.g., 100 µW/cm$^2$ in the configuration shown and operating at 12 volts DC). In contrast, prior art systems do not provide such a uniform intensity across an interior cross-sectional area. Those of skill in the art can select a suitable number and configuration of UV radiation sources and operational power level thereof to inactivate targeted microorganisms as a function of the size of the purification assembly and length of time the targeted microorganisms are exposed to UV radiation as they pass through the housing of the purification assembly.

With reference now to FIG. 19, a schematic longitudinal cross sectional view of a purification assembly 900 in accordance with an embodiment of the present invention is shown. Purification assembly 900 comprises a housing 902. Housing 902 defines a first open end 904 and a second open end 906. Open ends 904, 906 may be coupled with a duct to allow a fluid to flow from first open end 904 to second open end 906. Housing 902 also defines a longitudinal axis 908, and housing 902 may have any suitable cross-sectional shape, as described above. In this embodiment, housing 902 is circular.

In this embodiment, purification assembly 900 comprises an annular projection 910 that extends radially inward from an interior surface 912 of housing 902 toward longitudinal axis 908. In various embodiments, annular projection 910 may have any cross-sectional shape. In some embodiments, however, annular projection 910 defines a cross-sectional shape that allows UV radiation sources to be coupled with annular projection 910 and oriented in directions that are parallel with or at an angle to longitudinal axis 908. Thus, in some embodiments, UV radiation sources may face both the upstream and downstream fluid flow directions. In some embodiments, UV radiation sources may also be coupled with annular projection 910 and oriented to face a direction that is perpendicular to longitudinal axis 908.

More particularly, and for example, in the embodiment of FIG. 19, projection 910 may define a cross-sectional shape that is trapezoidal, although other shapes (e.g., square, dome, triangular, etc.) are contemplated. Projection 910 may thus define a first side 914, a second side 916, and a third side 918. Here, first side 914 may face an upstream direction, second side 916 may face a downstream direction, and third side 918 may face radially inward toward longitudinal axis 908. One or more UV radiation sources may be coupled with each of sides 914, 916, and/or 918. In an embodiment where housing 902 were pentagonal in shape rather than circular, fifteen (15) circuit boards each comprising a plurality UV LEDs could be provided (e.g., three circuit boards per interior side of the pentagonal housing, one on each of sides 914, 916, and 918). In various other embodiments, however, any number of UV radiation sources may be provided.

Each UV radiation source that is coupled with side 914 may emit a beam of electromagnetic radiation, and the beam may define a beam axis 920 that is at an angle (e.g., 45 degrees) relative to longitudinal axis 908. The beam may have a beam width that emits UV light over an angle α. Similarly, each UV radiation source that is coupled with side 916 may emit a beam of electromagnetic radiation, and the beam may define a beam axis 922 that is at an angle (e.g., 45 degrees) relative to longitudinal axis 908. The beam may have a beam width that emits UV light over an angle β. Likewise, each UV radiation source that is coupled with side 918 may emit a beam of electromagnetic radiation, and the beam may define a beam axis 924 that is at a right angle relative to longitudinal axis 908. The beam may have a beam width that emits UV light over an angle γ. These aspects are illustrated with respect to the lower portion of projection 910 only for the purpose of illustration, but it will be appreciated that they will apply to the entirety of projection 910 in this embodiment.

As a result, in this embodiment, targets of UV radiation may receive more UV radiation for a longer period of time and on more sides as they pass through housing 902 than they would if UV radiation sources were placed only, e.g., on side 918 of annular projection 910. In other words, the UV light curtain may have a greater length or depth in this embodiment. In some embodiments, UV light may also extend into the duct to which assembly 900 is coupled.

Based on the foregoing, it will be appreciated that embodiments of the invention provide improved apparatus and methods for fluid (e.g., air) purification. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A purification assembly for use in a duct, the purification assembly comprising:
   a housing defining a circular cross-section, the housing having an upstream end connectable with a first portion of the duct and a downstream end connectable with a second portion of the duct such that the first portion of the duct is in fluid communication with the second portion of the duct via the housing when the housing is connected with the duct, wherein the housing defines a cylindrical interior surface disposed between the housing upstream end and the housing downstream end;
   the housing further defining a longitudinal axis extending between the upstream and downstream ends of the housing;
   a plurality of ultraviolet (UV) radiation sources disposed in one or more rings about the entirety of the cylindrical interior surface of the housing, the UV radiation sources each configured to emit UV radiation toward the longitudinal axis.

2. The purification assembly of claim 1, wherein the plurality of UV radiation sources each have a beam axis extending in a direction perpendicular to the longitudinal axis.

3. The purification assembly of claim 1, further comprising a UV reflective material the interior surface of the housing, wherein the UV reflective material comprises a polytetrafluoroethylene ("PTFE") film.

4. The purification assembly of claim 1, further comprising at least one filter disposed within the housing and oriented perpendicularly with the longitudinal axis.

5. The purification assembly of claim 4, wherein the at least one filter comprises a photocatalyst material.

6. The purification assembly of claim 4, wherein the at least one filter comprises titanium dioxide impregnated glass.

7. A purification assembly for use in a duct, the purification assembly comprising:
- a housing, the housing having a first open end and an opposite second open end, the housing defining an interior volume extending between the first and second open ends;
- a longitudinal axis extending between the first open end and the second open end;
- an annular projection coupled with an interior surface of the housing, the annular projection extending radially inward toward the longitudinal axis, the annular projection having a polygonal cross-sectional shape and defining a plurality of surfaces facing the longitudinal axis;
- a plurality of UV radiation sources coupled with the annular projection, wherein the plurality of UV radiation sources comprises a set of UV radiation sources disposed on each surface of the plurality of surfaces.

8. The purification assembly of claim 7, wherein the annular projection has a hexagonal cross-sectional shape.

9. The purification assembly of claim 7, further comprising a set of UV radiation sources disposed at a 45 degree angle relative to the longitudinal axis.

10. The purification assembly of claim 7, wherein the annular projection lies on a plane extending perpendicular to the longitudinal axis.

11. The purification assembly of claim 10, wherein during operation of the plurality of UV radiation sources, the intensity of UV radiation along the plane is uniformly above a threshold.

12. The purification assembly of claim 11, wherein the threshold is about 100 $\mu W/cm^2$.

13. The purification assembly of claim 7, wherein the housing is formed of a flexible material.

14. The purification assembly of claim 7, wherein the housing is formed from sheet metal.

15. A method of using a purification assembly, the purification assembly comprising a housing comprising a plurality of walls connected together to define an interior volume, the housing having a first open end and an opposite second open end, and a longitudinal axis extending between the first open end and the second open end, the method comprising:
- attaching a plurality of UV radiation sources to respective interior surfaces of each of the plurality of walls of the housing, wherein at least a first set of the UV radiation sources lie on a plane;
- causing the first set of UV radiation sources to emit UV radiation along the plane in a first direction toward the longitudinal axis;
- flowing a stream of air through the housing toward the ring of UV radiation sources;
- wherein the UV radiation has an intensity that uniformly exceeds a threshold intensity along the entirety of the plane within the housing.

16. The method of claim 15, further comprising configuring a second set of UV radiation sources of the plurality of UV radiation sources to emit UV radiation in a second direction toward the first open end.

17. The method of claim 15, wherein the housing has a polygonal cross-sectional shape.

18. The method of claim 15, wherein the threshold is about 200 $\mu W/cm^2$.

19. The method of claim 15, wherein each of the plurality of UV radiation sources are disposed on a projection extending radially inward from the interior surface of the housing.

20. The method of claim 15, wherein the housing has a circular cross-sectional shape.

* * * * *